US012588114B2

(12) United States Patent
Kweon et al.

(10) Patent No.: US 12,588,114 B2
(45) Date of Patent: Mar. 24, 2026

(54) COOKING APPARATUS

(71) Applicant: SAMSUNG ELECTRONICS CO., LTD., Suwon-si (KR)

(72) Inventors: Sooncheol Kweon, Suwon-si (KR); Sangwon Yun, Suwon-si (KR); Hanseong Kang, Suwon-si (KR); Minho Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 772 days.

(21) Appl. No.: 17/959,426

(22) Filed: Oct. 4, 2022

(65) Prior Publication Data

US 2023/0199922 A1 Jun. 22, 2023

Related U.S. Application Data

(63) Continuation of application No. PCT/KR2022/012957, filed on Aug. 30, 2022.

(30) Foreign Application Priority Data

Dec. 17, 2021 (KR) ........................ 10-2021-0181319
Jan. 5, 2022 (KR) ........................ 10-2022-0001776

(51) Int. Cl.
*H05B 6/64* (2006.01)
*H04N 23/50* (2023.01)
*H05B 6/76* (2006.01)

(52) U.S. Cl.
CPC ........... *H05B 6/6447* (2013.01); *H04N 23/50* (2023.01); *H05B 6/642* (2013.01); *H05B 6/76* (2013.01)

(58) Field of Classification Search
CPC ...... H05B 6/64; H05B 6/6402; H05B 6/6423; H05B 6/642; H05B 6/6432; H05B 6/6444;

(Continued)

(56) References Cited

U.S. PATENT DOCUMENTS 6,007,242 A 12/1999 Uehashi et al.
7,696,454 B2 4/2010 Nam et al.
(Continued)

FOREIGN PATENT DOCUMENTS

CN 104287640 A 1/2015
EP 3 786 527 A1 3/2021
(Continued)

OTHER PUBLICATIONS

International Search Report dated Dec. 27, 2022 in International Patent Application No. PCT/KR2022/012957 (3 pages; 3 pages English translation).

(Continued)

*Primary Examiner* — Hung D Nguyen

(74) *Attorney, Agent, or Firm* — STAAS & HALSEY LLP

(57) ABSTRACT

A cooking apparatus including: a cabinet including a cooking chamber; an electromagnetic wave generating device provided to transmit electromagnetic waves into the cooking chamber; a photographing device provided to photograph an inside of the cooking chamber; an opening formed in the cabinet to correspond to the photographing device; and a resonance avoiding chamber provided between the cooking chamber and the photographing device to avoid resonance caused by the electromagnetic waves, the resonance avoiding chamber provided to reduce the electromagnetic waves inside the cooking chamber from leaking through the opening.

21 Claims, 26 Drawing Sheets

(58) Field of Classification Search

CPC ...... H05B 6/6447; H05B 6/6473; H05B 6/76;
G03B 17/02; G03B 17/55; G03B 30/00;
H04N 23/50; H04N 23/52; H04N 23/55;
H04N 23/57

See application file for complete search history.

(56) References Cited

U.S. PATENT DOCUMENTS

| | | | |
|---|---|---|---|
| 10,117,294 B2 | 10/2018 | Beifuss et al. | |
| 10,523,851 B2 | 12/2019 | Armstrong | |
| 10,701,770 B2 | 6/2020 | Jang et al. | |
| 10,794,599 B2 | 10/2020 | Jang et al. | |
| 11,547,240 B2 | 1/2023 | Eiter et al. | |
| 2003/0209544 A1* | 11/2003 | Jeung | H05B 6/6402 |
| | | | 219/756 |
| 2006/0157481 A1* | 7/2006 | Oh | H05B 6/6423 |
| | | | 219/757 |
| 2018/0058702 A1* | 3/2018 | Jang | F24C 7/081 |

FOREIGN PATENT DOCUMENTS

| | | |
|---|---|---|
| EP | 3 755 121 B1 | 10/2021 |
| EP | 3 610 198 B1 | 11/2022 |
| JP | 2003-56852 | 2/2003 |
| KR | 10-0306854 | 4/2002 |
| KR | 10-2007-0117386 | 12/2007 |
| KR | 10-0793794 | 1/2008 |
| KR | 10-2016-0139236 | 12/2016 |
| KR | 10-2017-0013883 | 2/2017 |
| KR | 10-2018-0025787 | 3/2018 |
| WO | WO 2019/101528 A1 | 5/2019 |

OTHER PUBLICATIONS

PCT/ISA/237 dated Dec. 27, 2022 in International Patent Application No. PCT/KR2022/012957 (4 pages).

European Search Report issued Jan. 22, 2025 for European Application No. 22907616.1.

Korean Office Action dated Sep. 11, 2025 for Korean Application No. 10-2022-0001776.

* cited by examiner

COOKING APPARATUS

CROSS-REFERENCE TO RELATED APPLICATION

This application is a continuation application, under 35 USC § 111(a), of International Application No. PCT/KR2022/012957, filed on Aug. 30, 2022, which claims priority to Korean Patent Application No. 10-2021-0181319 filed on Dec. 17, 2021 and Korean Patent Application No. 10-2022-0001776 filed on Jan. 5, 2022 the disclosures of which are incorporated herein by reference in their entireties.

1. FIELD

The disclosure relates to a cooking apparatus having an improved structure.

2. DESCRIPTION OF RELATED ART

A cooking apparatus is an apparatus for heating and cooking a cooking object, such as food, and refers to an apparatus capable of providing various functions related to cooking, such as heating, thawing, drying, and sterilizing of a cooking object. Examples of the cooking apparatus may include an oven, such as a gas oven or an electric oven, a microwave heating device (hereinafter referred to as a microwave oven), a gas range, an electric range, and a hood combined microwave oven (Over The Range, OTR), a gas grill, electric grill, or the like.

In general, a microwave is an appliance that cooks food using frictional heat generated by disturbing the arrangement of water molecules in food through electromagnetic waves, and an oven is an appliance that cooks food by directly transferring heat to food through a heat source, such as a heater that generates heat, or by heating the inside of a cooking chamber through the heat source.

On the other hand, there is a need for a cooking apparatus having a camera to identify information about food arranged in the cooking chamber or to monitor a cooking state of the food. In this case, the cooking apparatus may have a photographing opening through which an optical signal may pass.

However, in the case of a cooking apparatus using electromagnetic waves, electromagnetic waves may leak through the photographing opening.

SUMMARY

According to an aspect of the disclosure, there is provided a cooking apparatus including: a cabinet including a cooking chamber, the cooking chamber positioned at an interior of the cabinet; an electromagnetic wave generating device to emit electromagnetic waves into the cooking chamber, the electromagnetic wave generating device being positioned outside the cooking chamber; a photographing device to photograph an interior of the cooking chamber, the photographing device being positioned outside the cooking chamber; an opening formed in the cabinet to correspond to the photographing device to allow an optical signal from the photographing device to pass through to the cooking chamber; and a resonance avoiding chamber positioned between the cooking chamber and the photographing device to reduce resonance caused by the electromagnetic waves and reduce the electromagnetic waves inside the cooking chamber from leaking through the opening to the exterior of the cooking chamber.

The opening may be a first opening, and the first opening is positioned at one side of the resonance avoiding chamber and connected with the resonance avoiding chamber, and the cooking apparatus may further include a second opening positioned at another side of the resonance avoiding chamber while facing the first opening, the second opening connecting the resonance avoiding chamber with the cooking chamber.

The resonance avoiding chamber may be formed inside the cabinet, and the photographing device is disposed outside the cabinet.

The cooking apparatus may further include an electrical equipment chamber separated from the cooking chamber and to accommodate the electromagnetic wave generating device and the photographing device; and a cooling fan configured to suction air and discharge the air into the electrical equipment chamber to cool the electrical equipment chamber.

The cooking apparatus may include a guide duct formed to extend from a part of a discharge side of the cooling fan to the photographing device to guide the discharged air from the cooling fan.

The cooking apparatus may further include an air intake port, formed at a rear side of the cabinet, through which the air is suctioned.

A suction side of the cooling fan may be connected with the air intake port, and a discharge side of the cooling fan may be adjacent to the electrical equipment chamber such that the air suctioned by the air intake port may flow forward toward the electrical equipment chamber.

The second opening may have a maximum width that may be less than or equal to ½ of a wavelength of the electromagnetic waves, and a minimum distance from the second opening to the first opening may be larger than or equal to ⅛ of the wavelength of the electromagnetic waves.

The cooking apparatus may further include a window member attachable to and detachable from the resonance avoiding chamber to protect the photographing device from the cooking chamber.

The window member may include a first glass and a second glass, the second glass being spaced apart from the first glass, and an air insulation layer may be formed between the first glass and the second glass.

The photographing device may include: a camera; a camera holder to mount the camera thereon; and a gasket, mountable on the camera holder, configured to maintain airtight between the camera and the opening, while the gasket is mounted on the camera holder.

The cabinet may be an inner cabinet, and the cooking apparatus may further include: an outer cabinet to cover the inner cabinet and the electrical equipment chamber; an exhaust passage, formed to extend along an upper side and lower side direction between the inner cabinet and the outer cabinet, through which the air having cooled the electrical equipment chamber flows; and an exhaust port formed at a lower side of the outer cabinet so that the air flowing through the exhaust passage is discharged outside of the cooking apparatus.

The cabinet may further include a first region; and a second region, the second region different from the first region, the second region including the first opening and formed to extend upward from the first region.

The cooking apparatus may further include a cover panel including the second opening and disposed below the second region, and the resonance avoiding chamber may be formed by the second region and the cover panel.

The guide duct may further include a wire holder on which a wire disposed in the electrical equipment chamber may be mountable.

According to an aspect of the disclosure, there is provided a cooking apparatus including: a main body including a cooking chamber and an electrical equipment chamber provided at an upper side of the cooking chamber; a camera disposed in the electrical equipment chamber to face an inside of the cooking chamber; a resonance avoiding chamber having an upper side corresponding to the camera to photograph the inside of the cooking chamber and a lower side communicating with the cooking chamber, the resonance avoiding chamber configured to avoid resonance by electromagnetic waves in the cooking chamber between the cooking chamber and the camera; an intake port formed on a rear side of the main body to communicate with an outside of the main body; and a cooling fan provided to cool the electric equipment chamber and disposed such that a suction side of the cooling fan communicates with the intake port and at least a part of a discharge side of the cooling fan faces the camera.

The cooking apparatus may further include a window member provided in the resonance avoiding chamber to protect the camera from the cooking chamber.

The cooking apparatus may further include a guide duct provided to guide the air discharged from the cooling fan to the camera.

The cooking apparatus may further include a gasket provided to seal between the camera and the resonance avoiding chamber.

The resonance avoiding chamber includes a region, communicating with the cooking chamber, having a maximum width less than or equal to ½ of a wavelength of the electromagnetic waves, wherein a height from the region communicating with the cooking chamber to a region corresponding to the camera is greater than or equal to ⅛ of the wavelength of the electromagnetic waves.

BRIEF DESCRIPTION OF THE DRAWINGS

The above and other aspects, features, advantages of certain embodiments of the present disclosure will be more apparent from the following description taken in conjunction with the accompanying drawings, in which.

4

Figure 10:
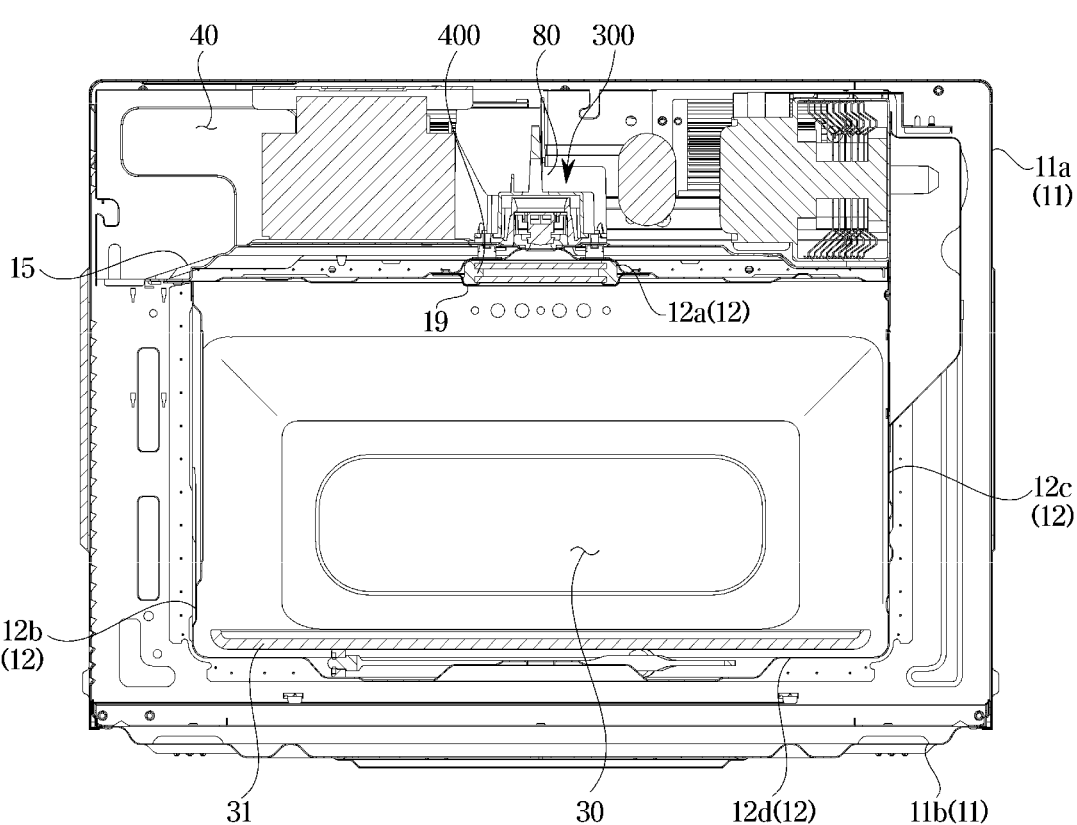
FIG. 10 is a cross-sectional view taken along line C-C' of the cooking apparatus shown in FIG. 1.
Figure 11:
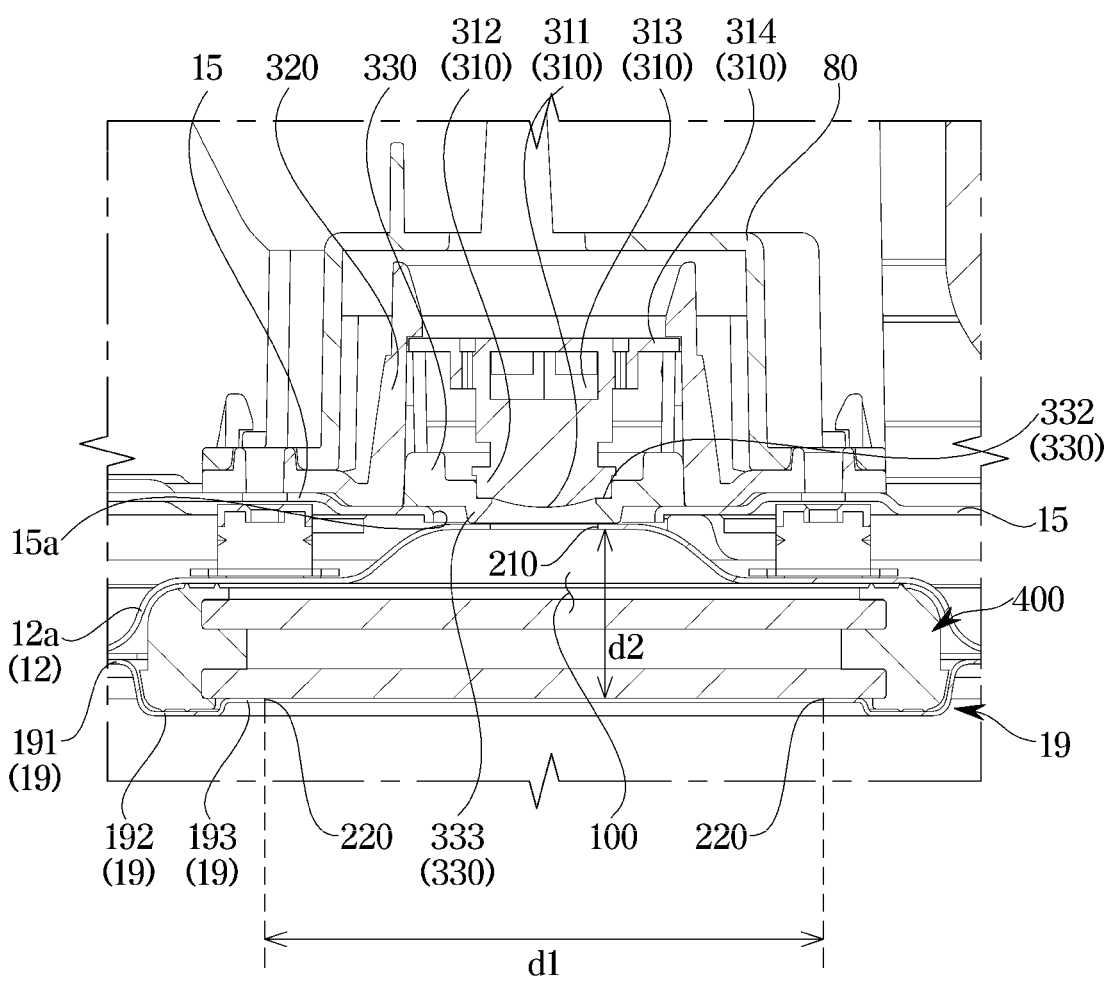

FIG. 11 is a partially enlarged view of the cooking apparatus shown in FIG. 10.

Figure 5:
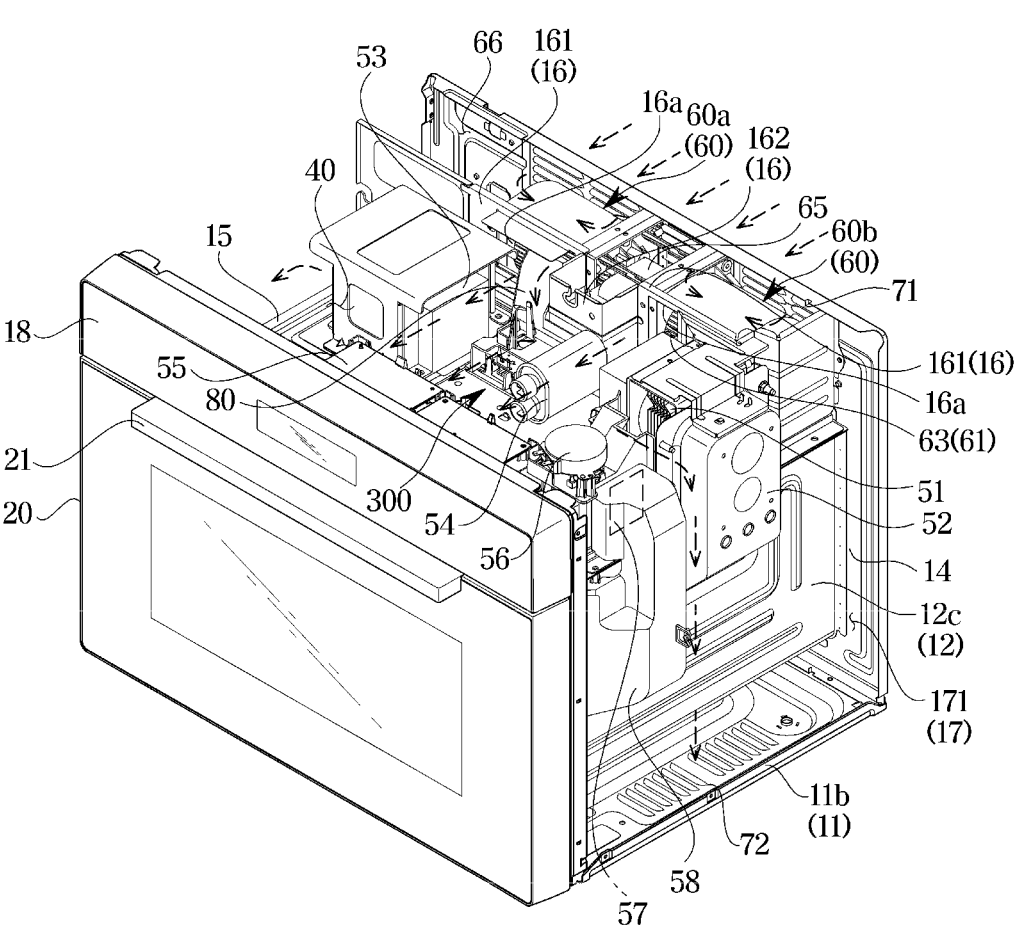
FIG. 5 is a view illustrating the cooking apparatus shown in FIG. 1 with a part of an outer cabinet removed.
Figure 12:
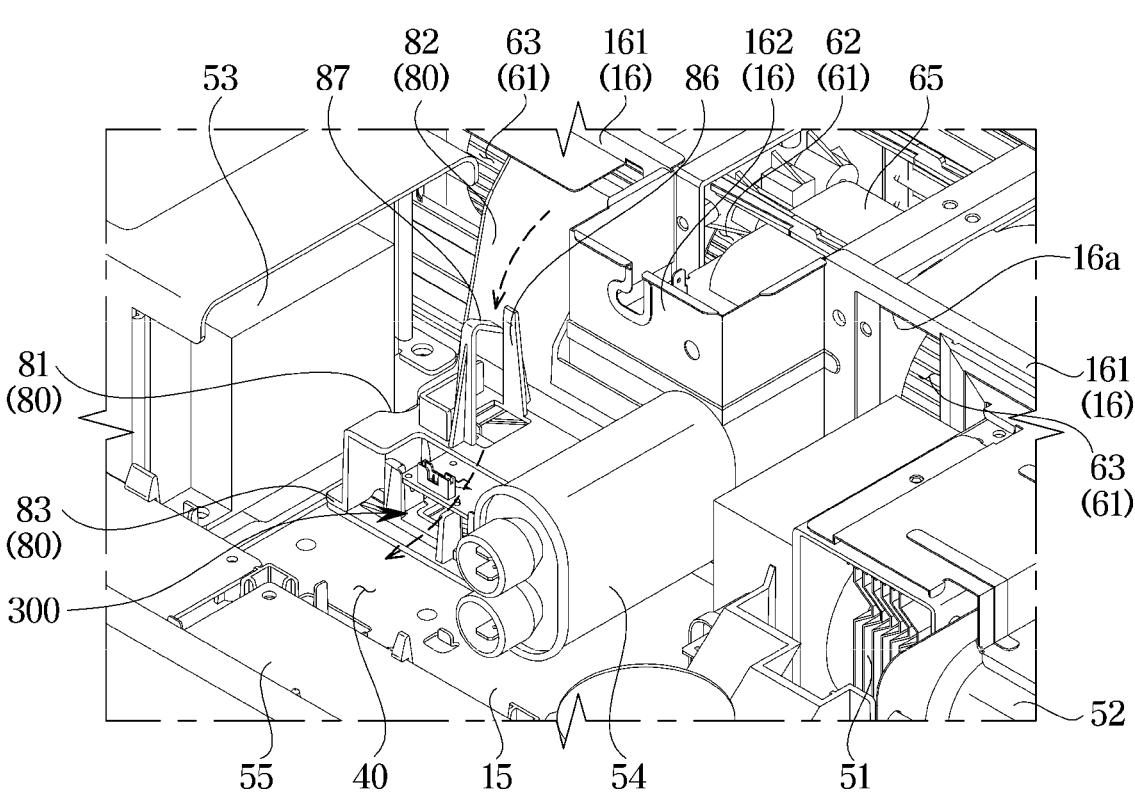

FIG. 12 is a partially enlarged view of the cooking apparatus shown in FIG. 5.

Figure 13:
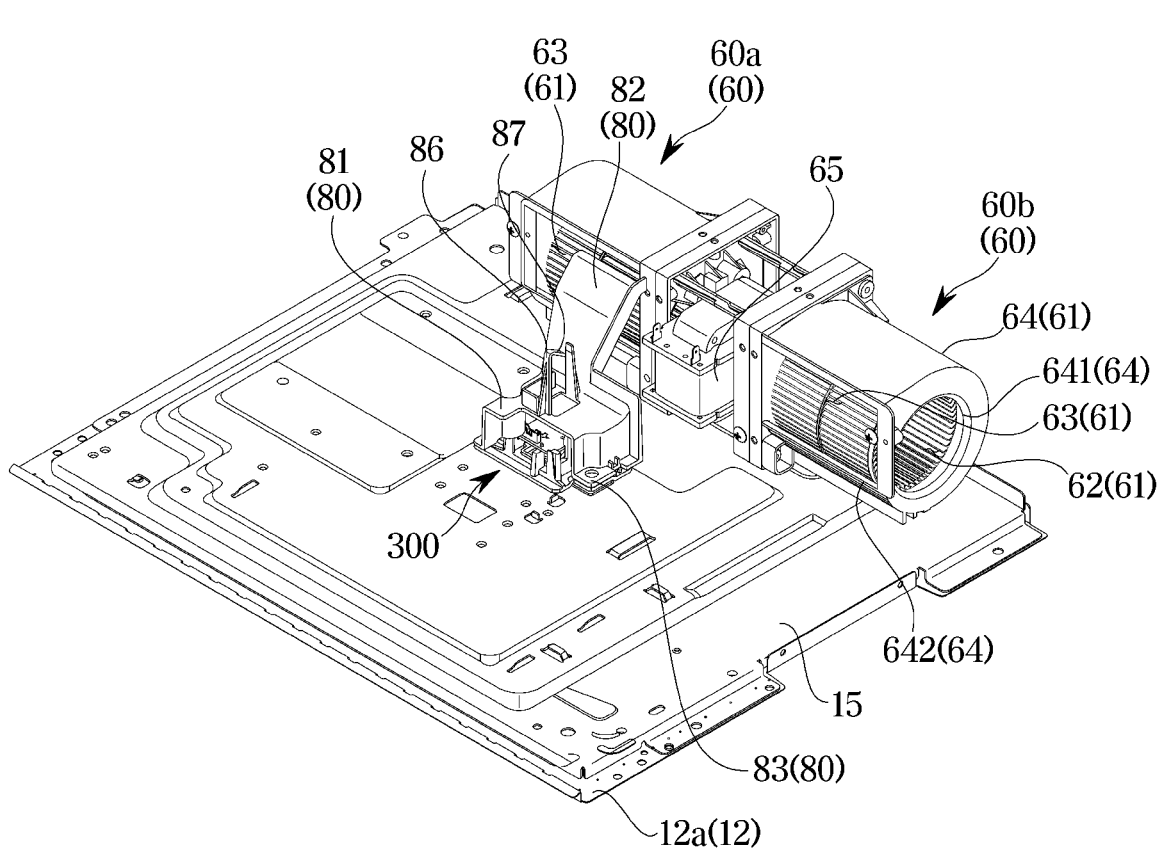

FIG. 13 is a perspective view illustrating some components of the cooking apparatus shown in FIG. 5.

Figure 14:
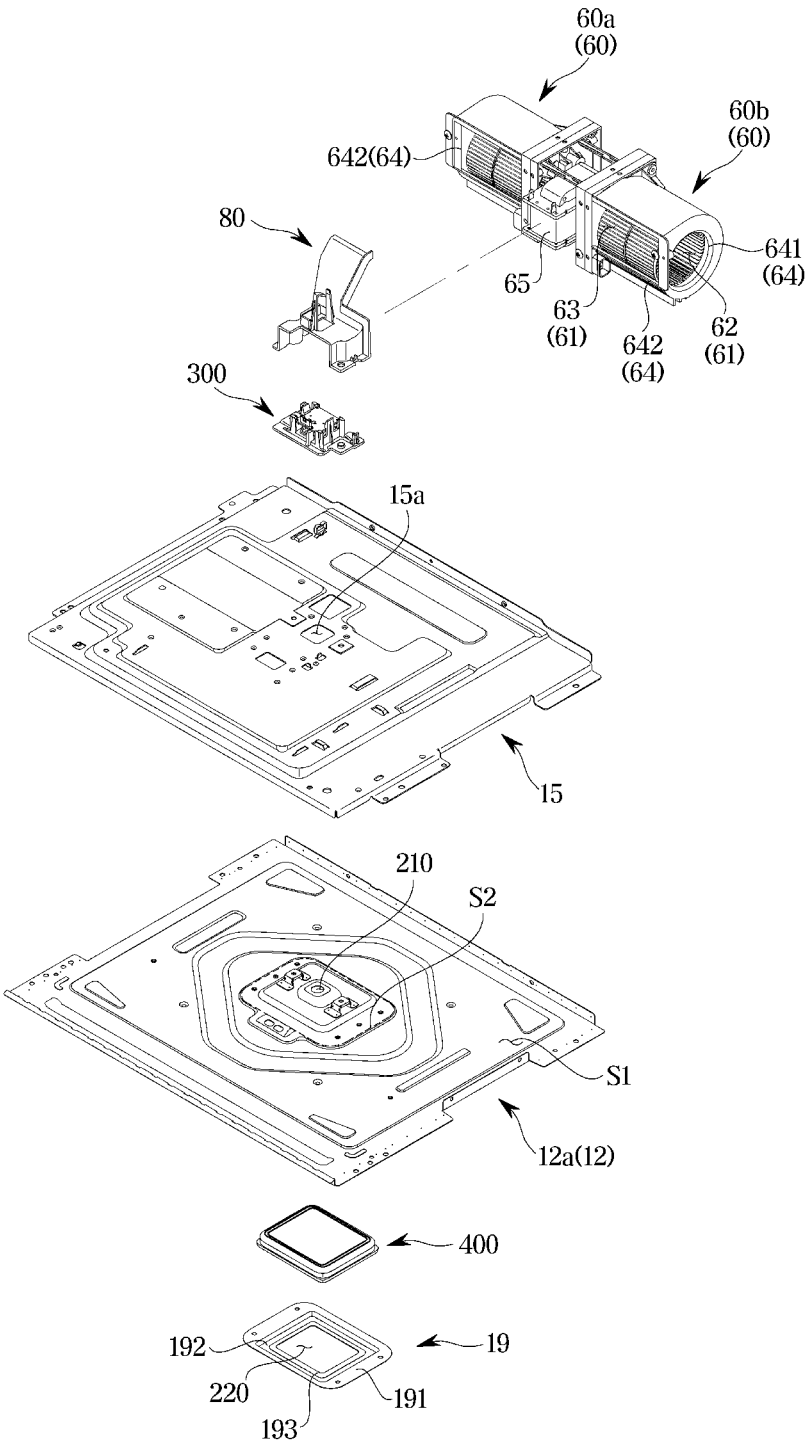

FIG. 14 is an exploded perspective view illustrating some components of the cooking apparatus shown in FIG. 13.

Figure 15:
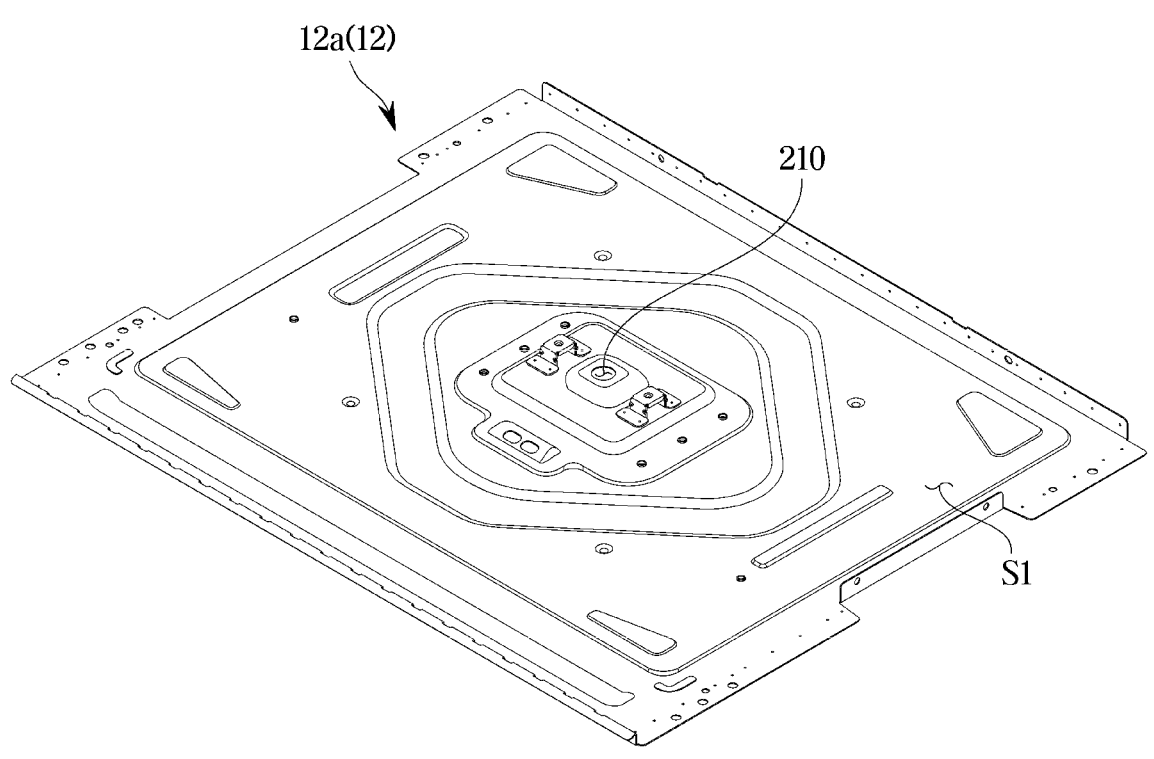

FIG. 15 is a perspective view illustrating an upper plate and a cover member shown in FIG. 13 that are coupled to each other.

Figure 16:
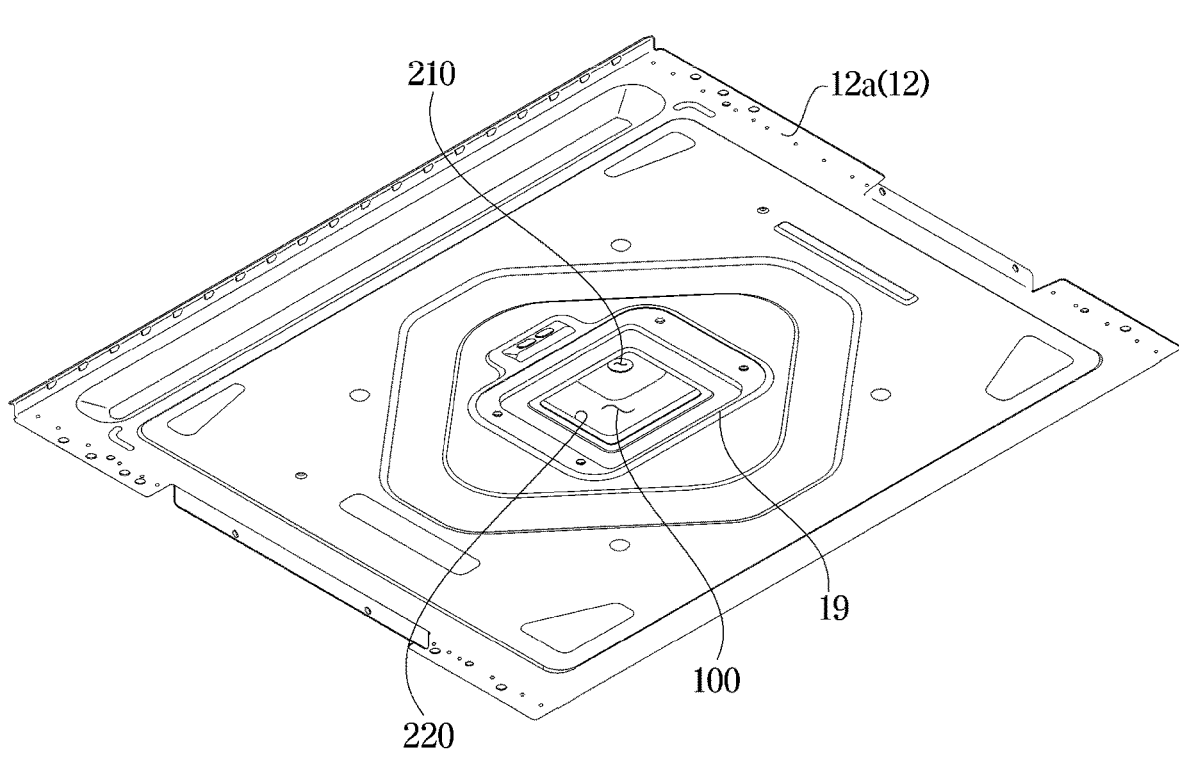

FIG. 16 is a bottom perspective view illustrating the upper plate and the cover member shown in FIG. 15.

Figure 17:
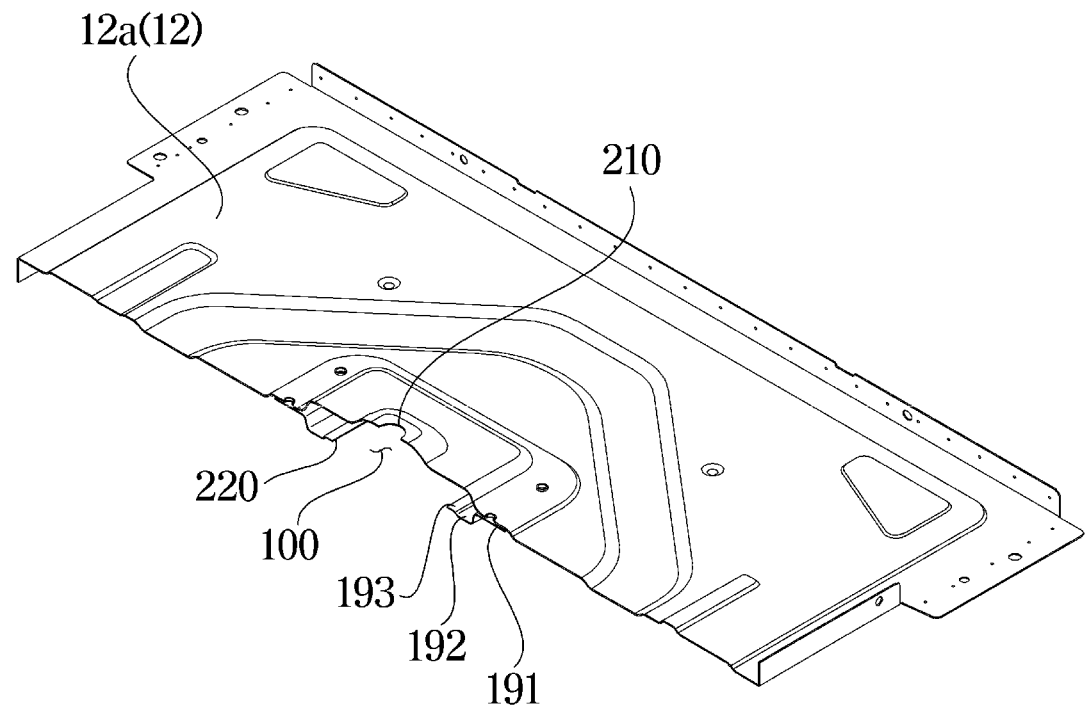

FIG. 17 is a cutaway perspective view illustrating the upper plate and the cover member shown in FIG. 15.

Figure 18:
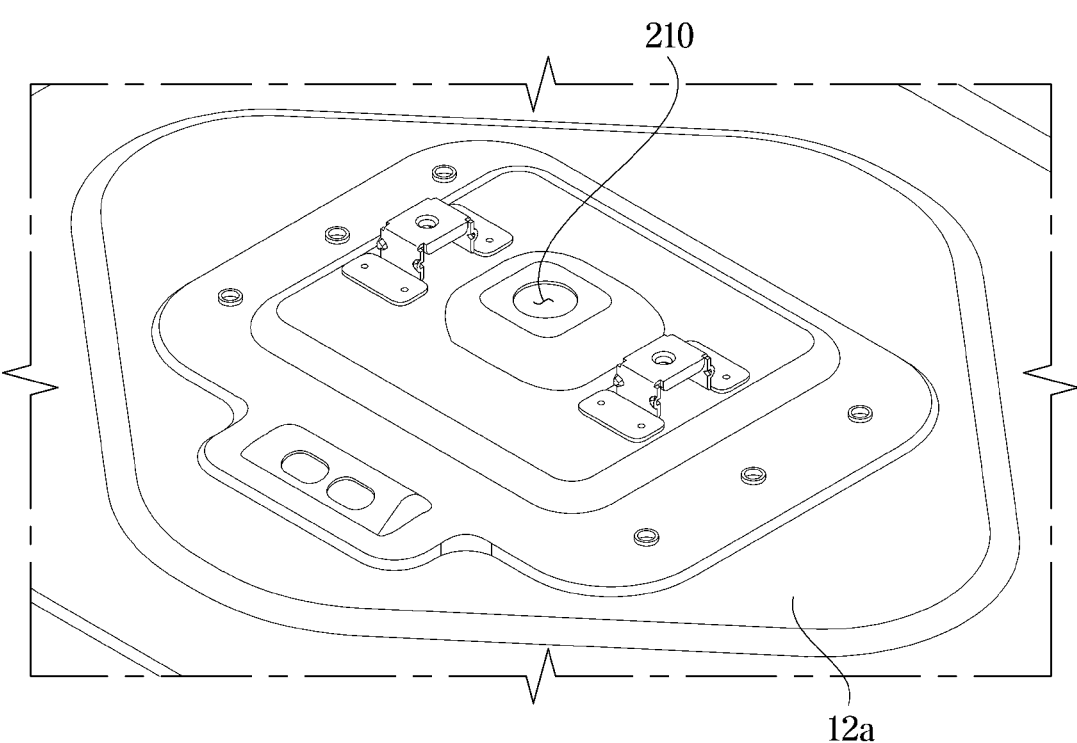

FIG. 18 is an enlarged view illustrating the upper plate shown in FIG. 13.

Figure 19:
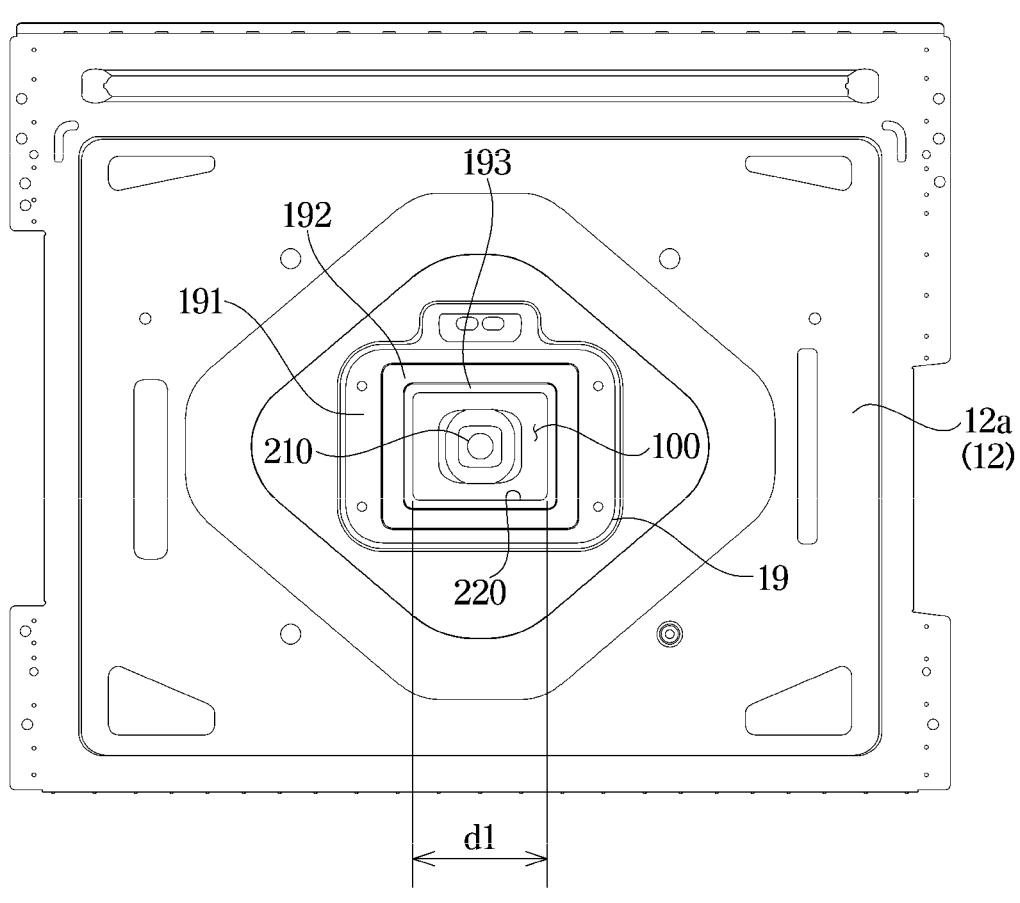

FIG. 19 is a bottom view illustrating the upper plate and the cover member shown in FIG. 13.

Figure 20:
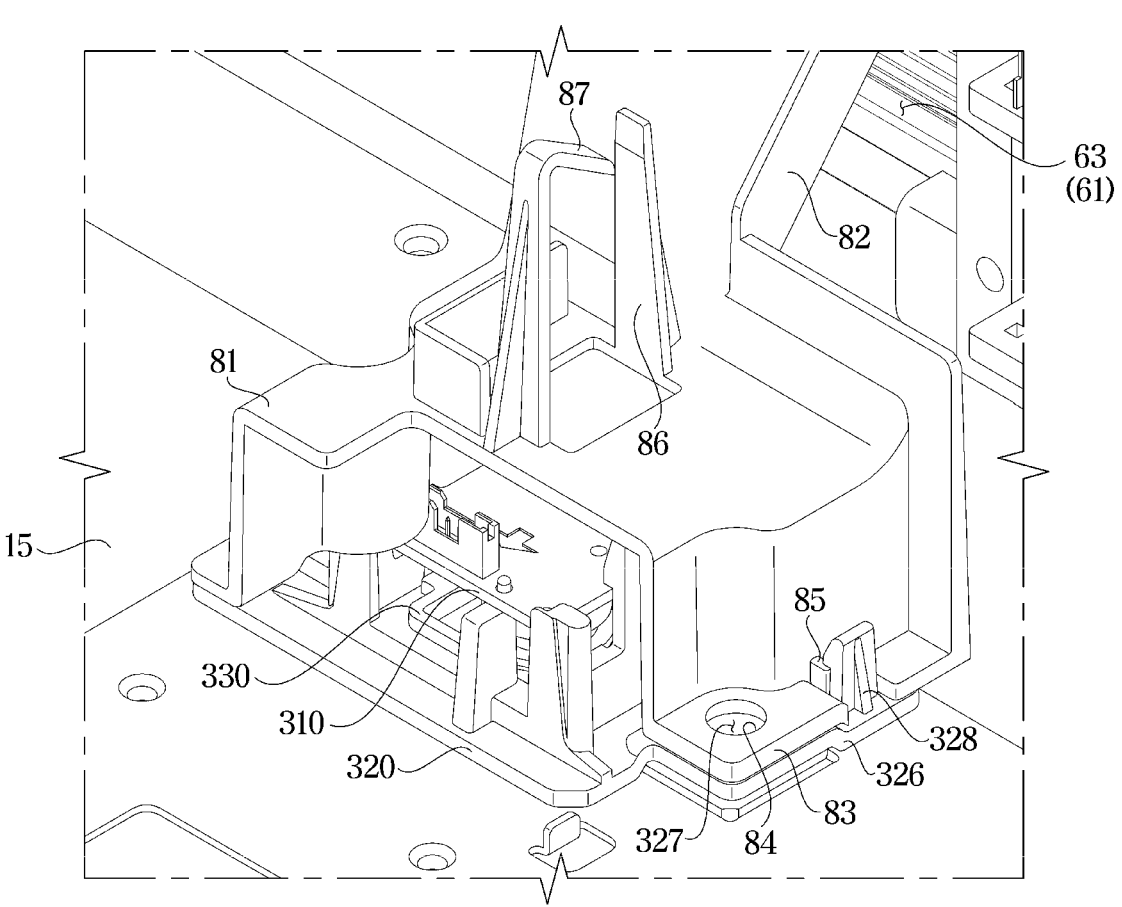

FIG. 20 is an enlarged view illustrating some components of the cooking apparatus shown in FIG. 13.

Figure 21:
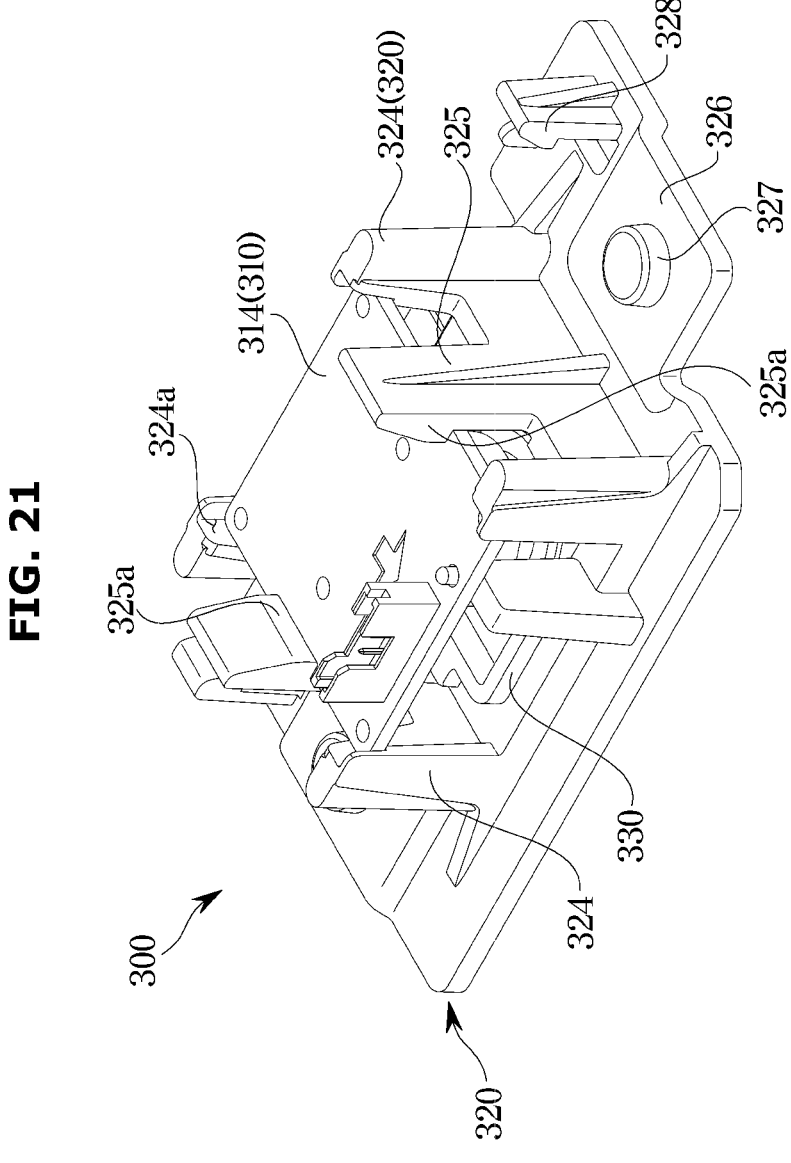

FIG. 21 is a perspective view illustrating a photographing device shown in FIG. 13.

Figure 22:
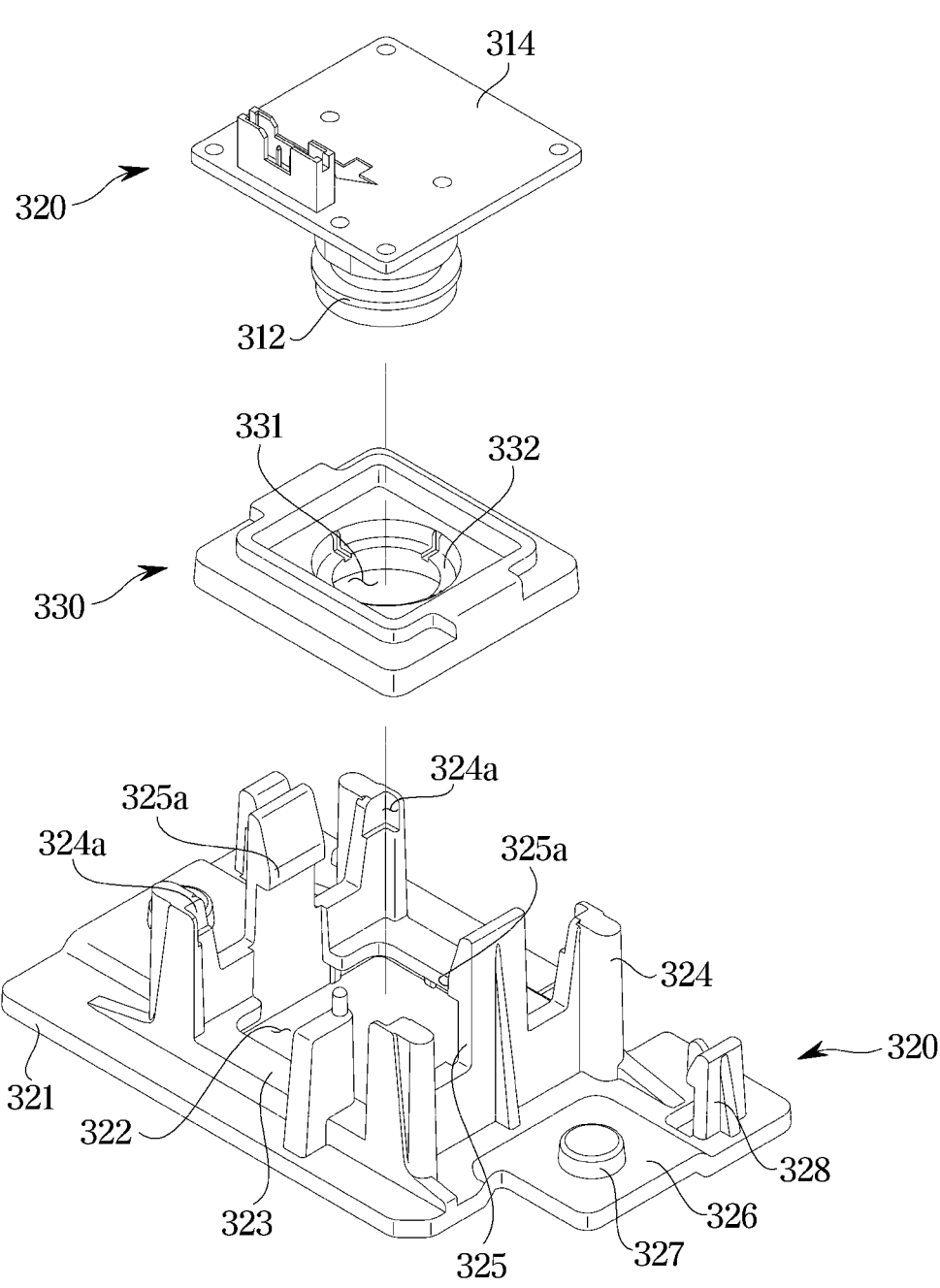

FIG. 22 is an exploded perspective view illustrating the photographing device shown in FIG. 21.

Figure 23:
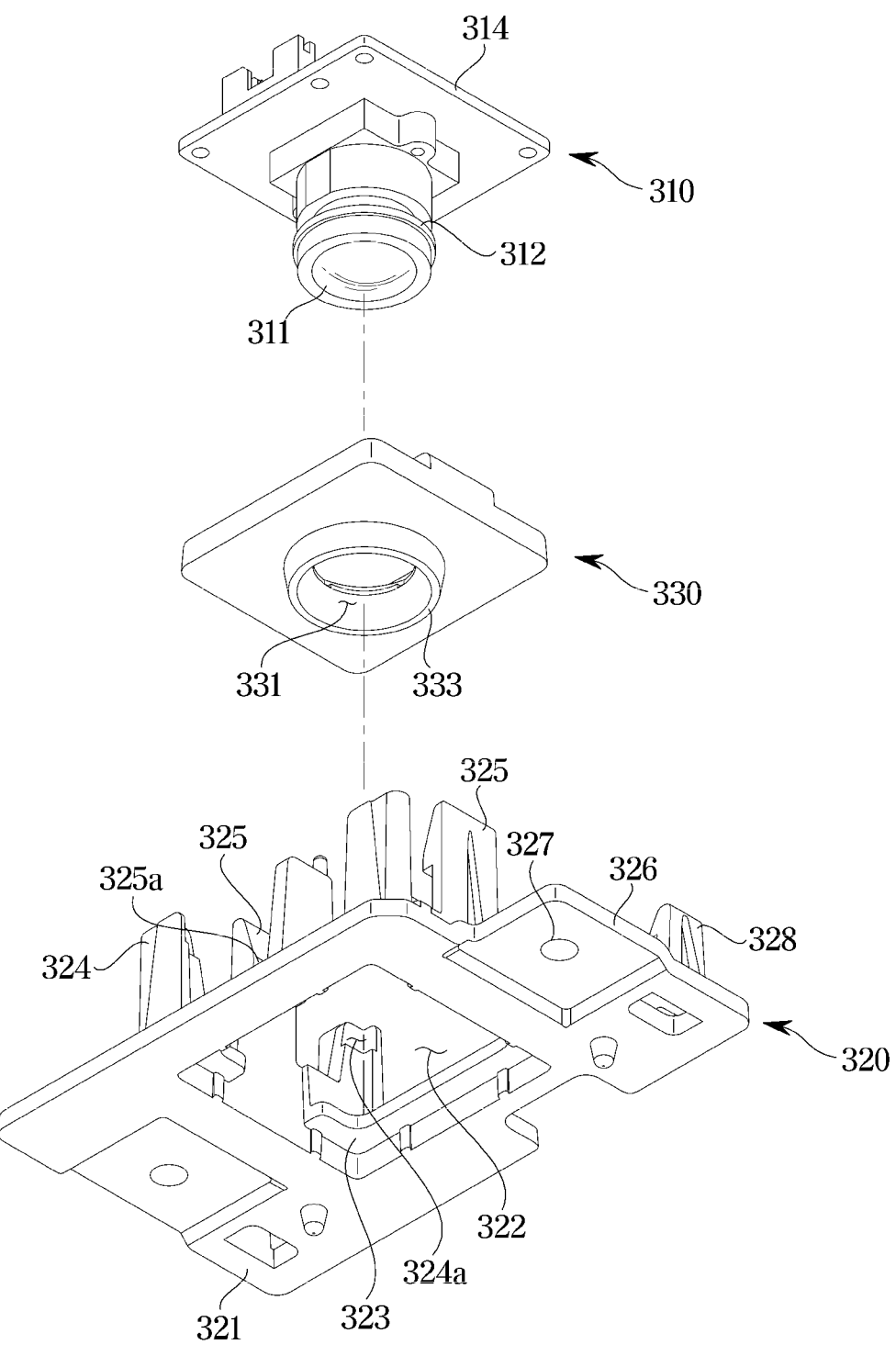

FIG. 23 is an exploded perspective view illustrating the photographing device shown in FIG. 22, which is seen in a different direction.

Figure 24:
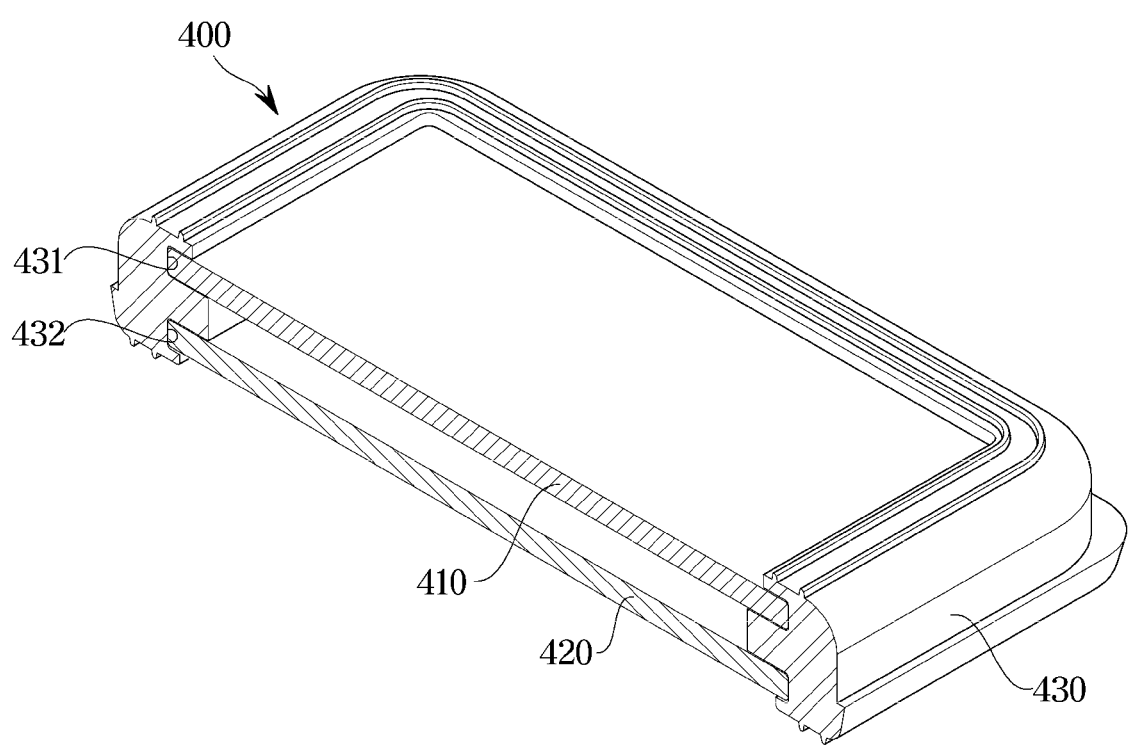

FIG. 24 is a cutaway perspective view illustrating a window member shown in FIG. 13.

Figure 25:
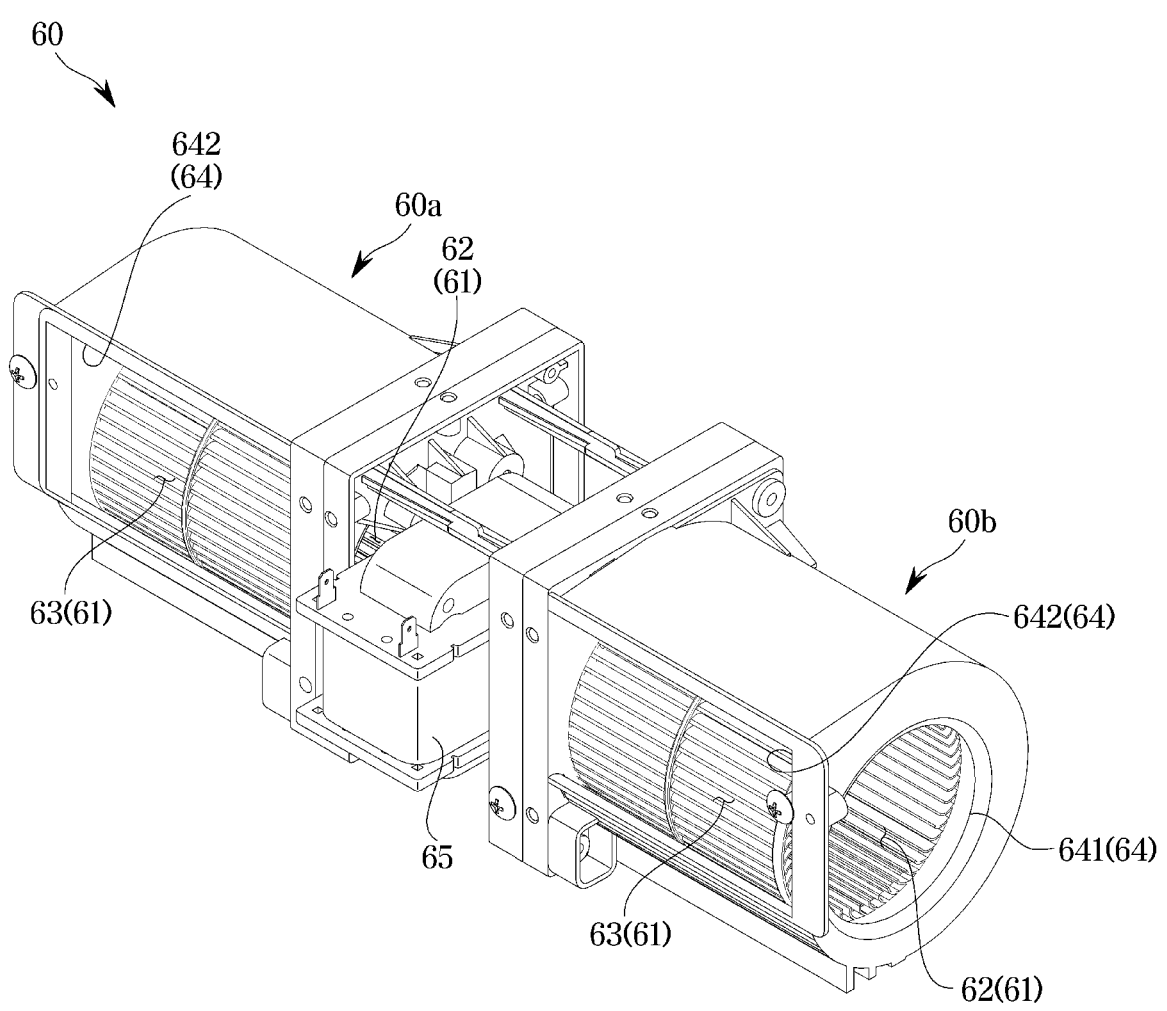

FIG. 25 is a perspective view illustrating a blower shown in FIG. 13.

Figure 26:
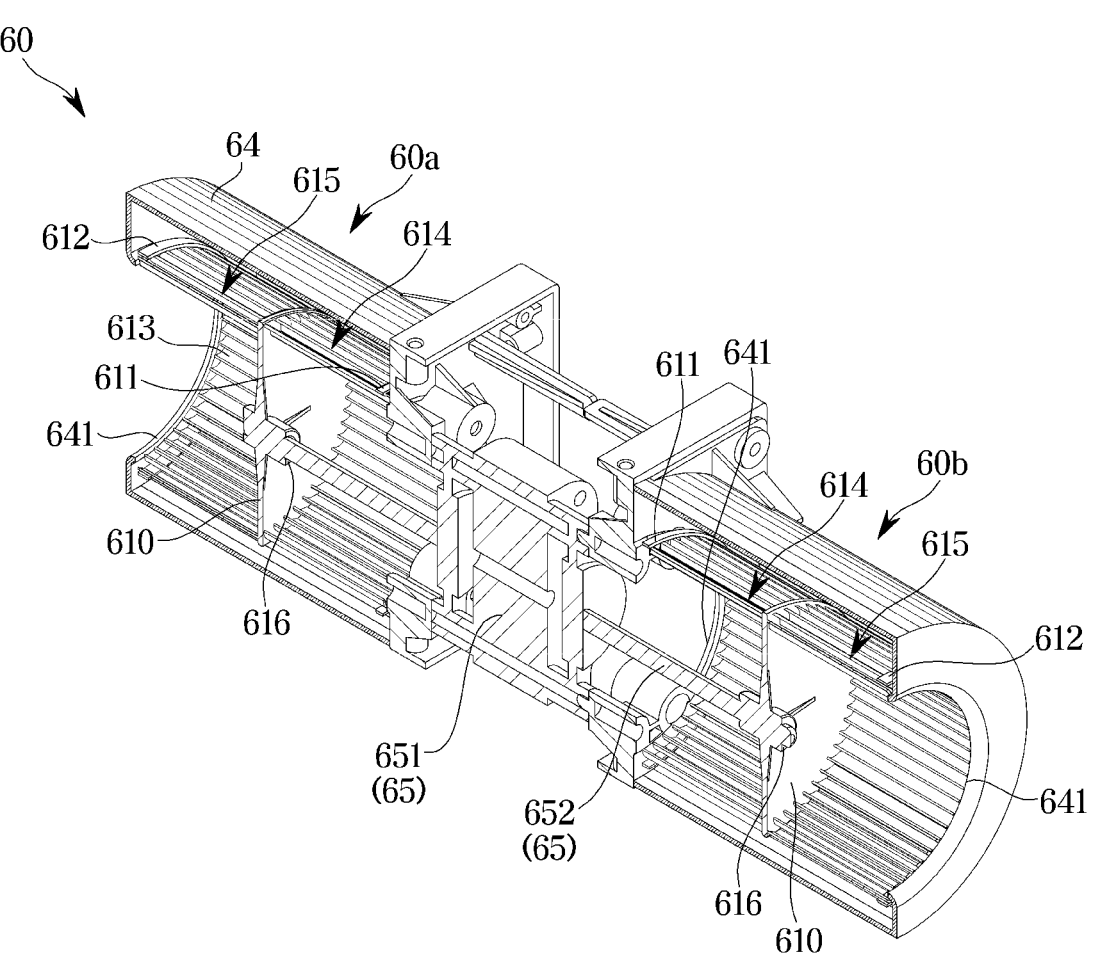

FIG. 26 is a cutaway perspective view illustrating a blower shown in FIG. 13.

DETAILED DESCRIPTION

Embodiments described in the specification and configurations shown in the accompanying drawings are merely examples of the disclosure, and various modifications may replace the embodiments and the drawings of the disclosure.

Further, identical symbols or numbers in the drawings of the disclosure denote components or elements configured to perform substantially identical functions.

Further, terms used herein are only for the purpose of describing particular embodiments and are not intended to limit to the disclosure. The singular form is intended to include the plural form as well, unless the context clearly indicates otherwise. It need to be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

When a part is referred to as being "connected to" another part, it may not only be directly connected to the other part but may in addition be indirectly connected to the other part. Similarly, when a part is referred to as being "coupled to" another part, it may not only be directly coupled to the other part but may in addition be indirectly coupled to the other part.

In the description of an embodiment, it will be understood that, when a layer is referred to as being "on/under" another layer or substrate, it may be directly on/under the other layer or substrate, or one or more intervening layers may in addition be present.

Further, it need to be understood that, although the terms "first," "second," etc. may be used herein to describe various elements, the elements are not limited by the terms, and the terms are only used to distinguish one element from another. For example, a first element could be termed a second element, and similarly, a second element could be termed a first element without departing from the scope of the disclosure. The term "and/or" includes combinations of one or all of a plurality of associated listed items.

On the other hand, the terms "horizontal direction", "vertical direction", "front side", "rear side", "lateral side", "lower side", etc. used in the following description are defined based on the drawings, and the shape and location of each component are not limited thereto. For example, referring to FIG. 1, an X direction may be referred to as a front-rear direction, a Y direction may be referred to as a left-right direction, and a Z direction may be referred to as a upper-lower direction. For example, referring to FIG. 1, a direction in which a door 20 faces in the cooking apparatus 1 may be defined as a forward direction (+X direction), and the opposite direction may be defined as a backward direction (−X direction).

According to one aspect of the disclosure, the cooking apparatus can block or minimize leakage of electromagnetic waves generated inside the cooking chamber.

According to one aspect of the disclosure, the cooking apparatus can facilitate photographing of the inside of the cooking chamber by increasing the aperture ratio of the opening through which the optical signal passes. Hereinafter, an embodiment according to the disclosure will be described in detail with reference to the accompanying drawings.

Figure 1:
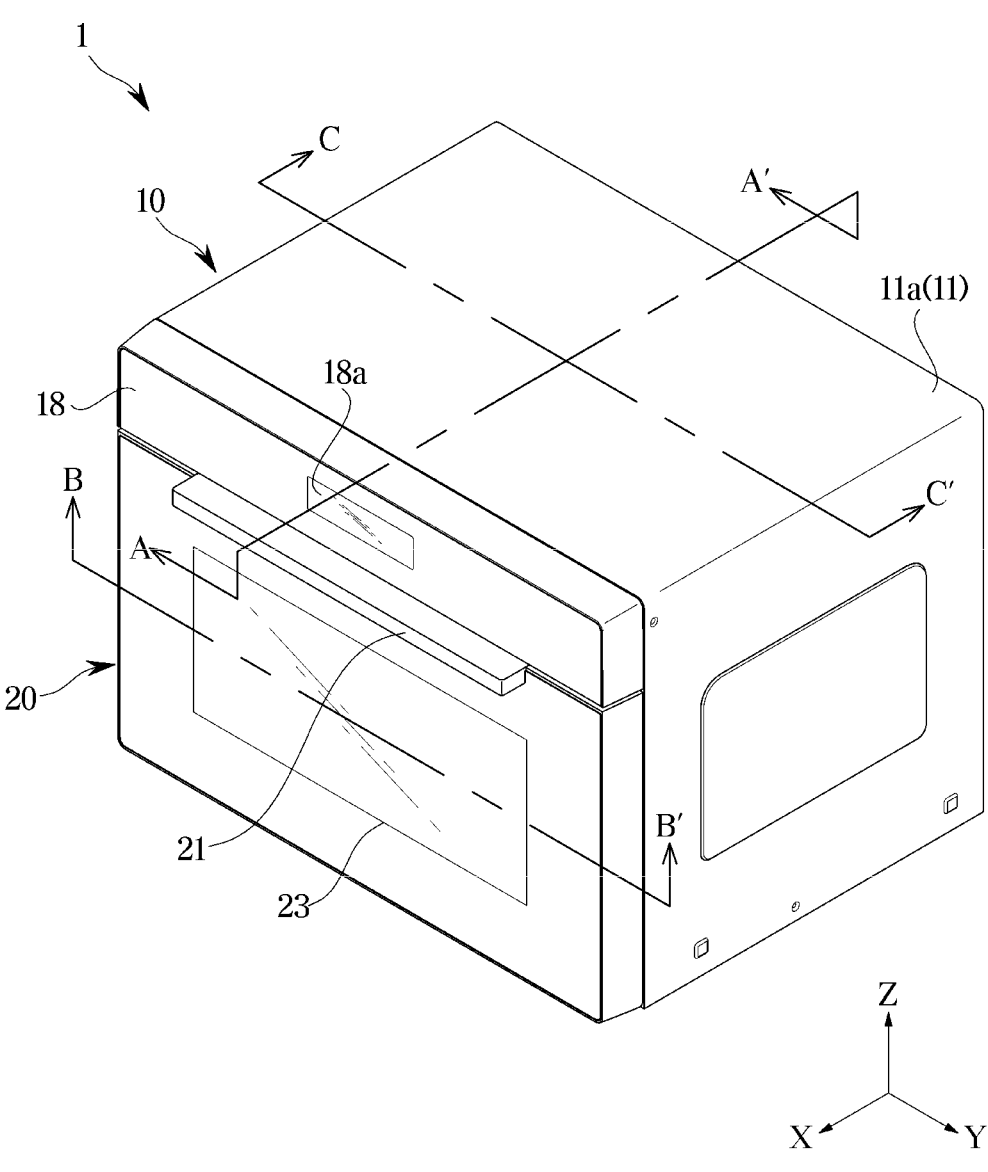
FIG. 1 is a perspective view illustrating an example of a cooking apparatus according to an embodiment.
Figure 2:
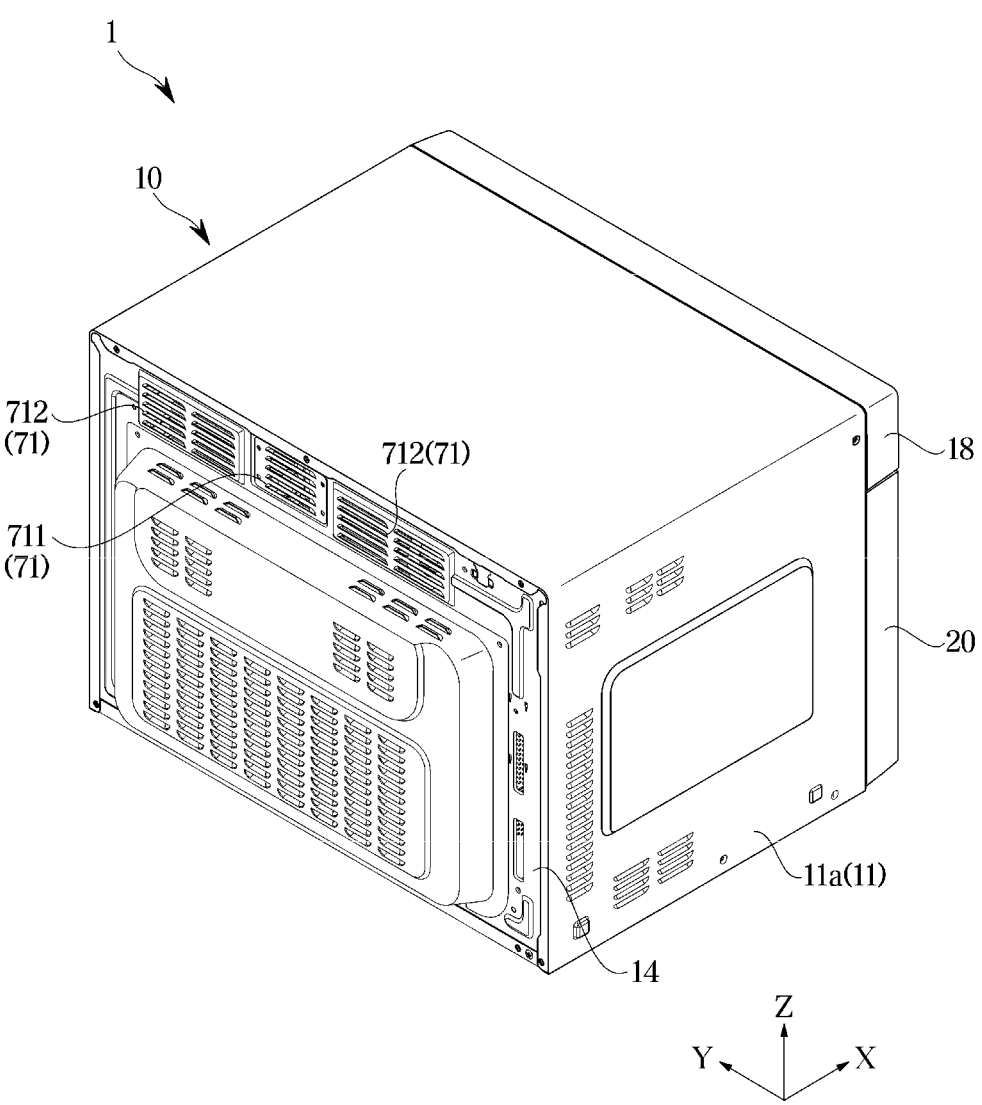
FIG. 2 is a rear perspective view illustrating the cooking apparatus shown in FIG. 1.
Figure 3:
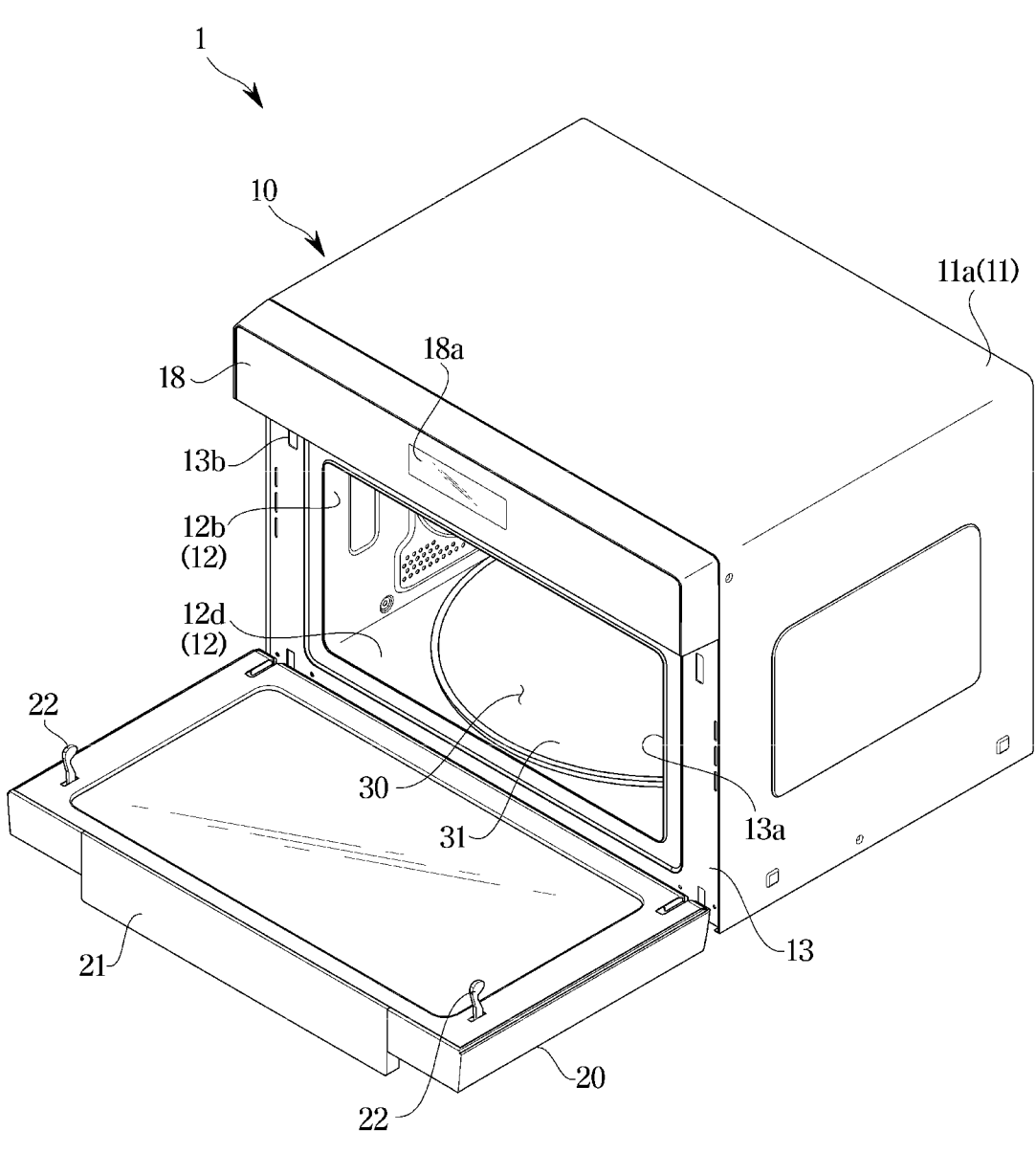
FIG. 3 is a perspective view illustrating the cooking apparatus shown in FIG. 1 with a door open.
Figure 4:
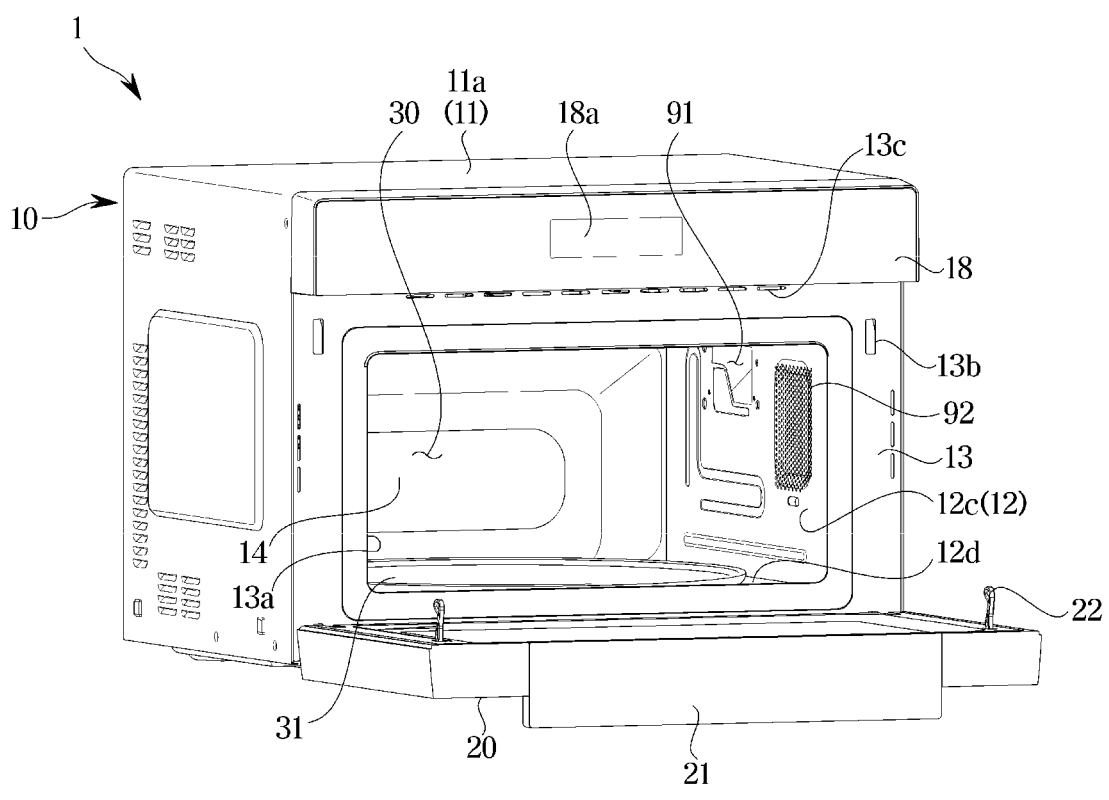
FIG. 4 is a perspective view illustrating the cooking apparatus shown in FIG. 3, which is seen in a different direction.
Figure 6:
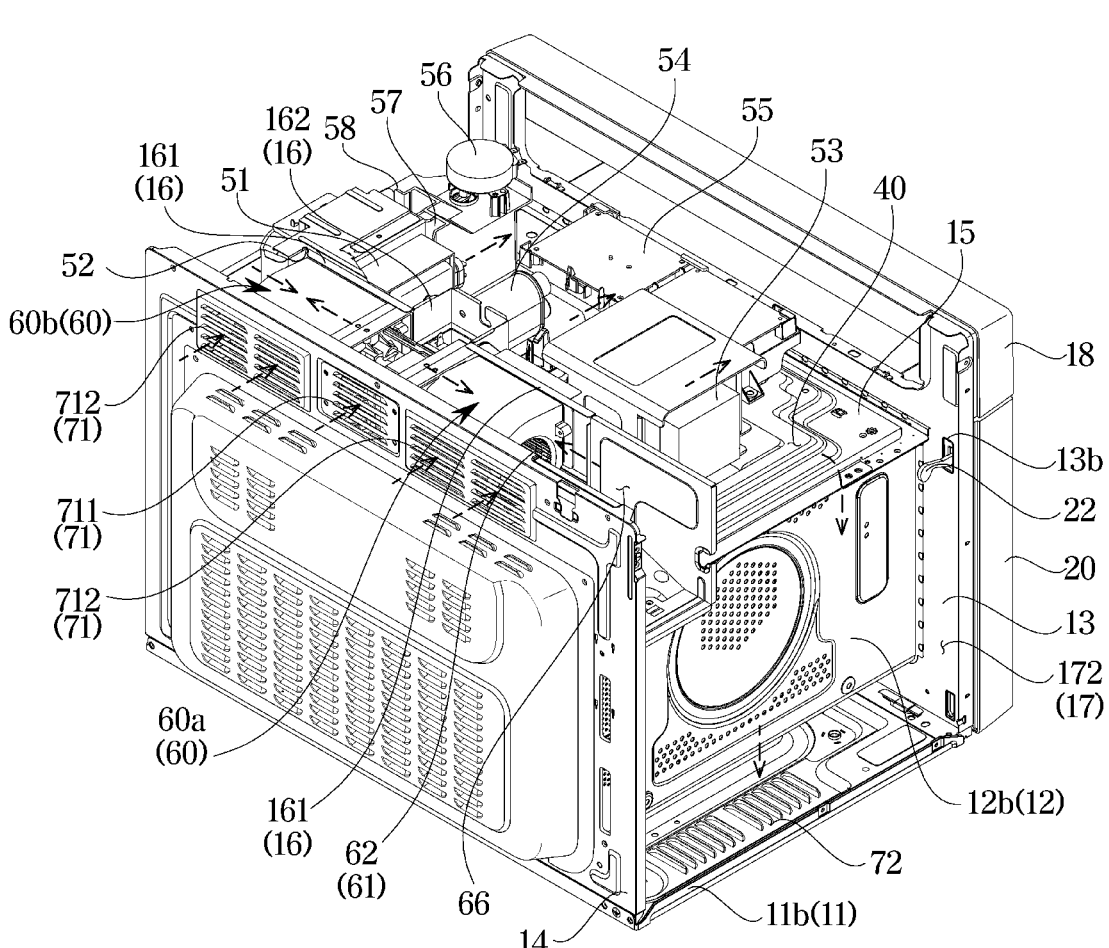
FIG. 6 is a rear perspective view illustrating the cooking apparatus shown in FIG. 5.
Figure 7:
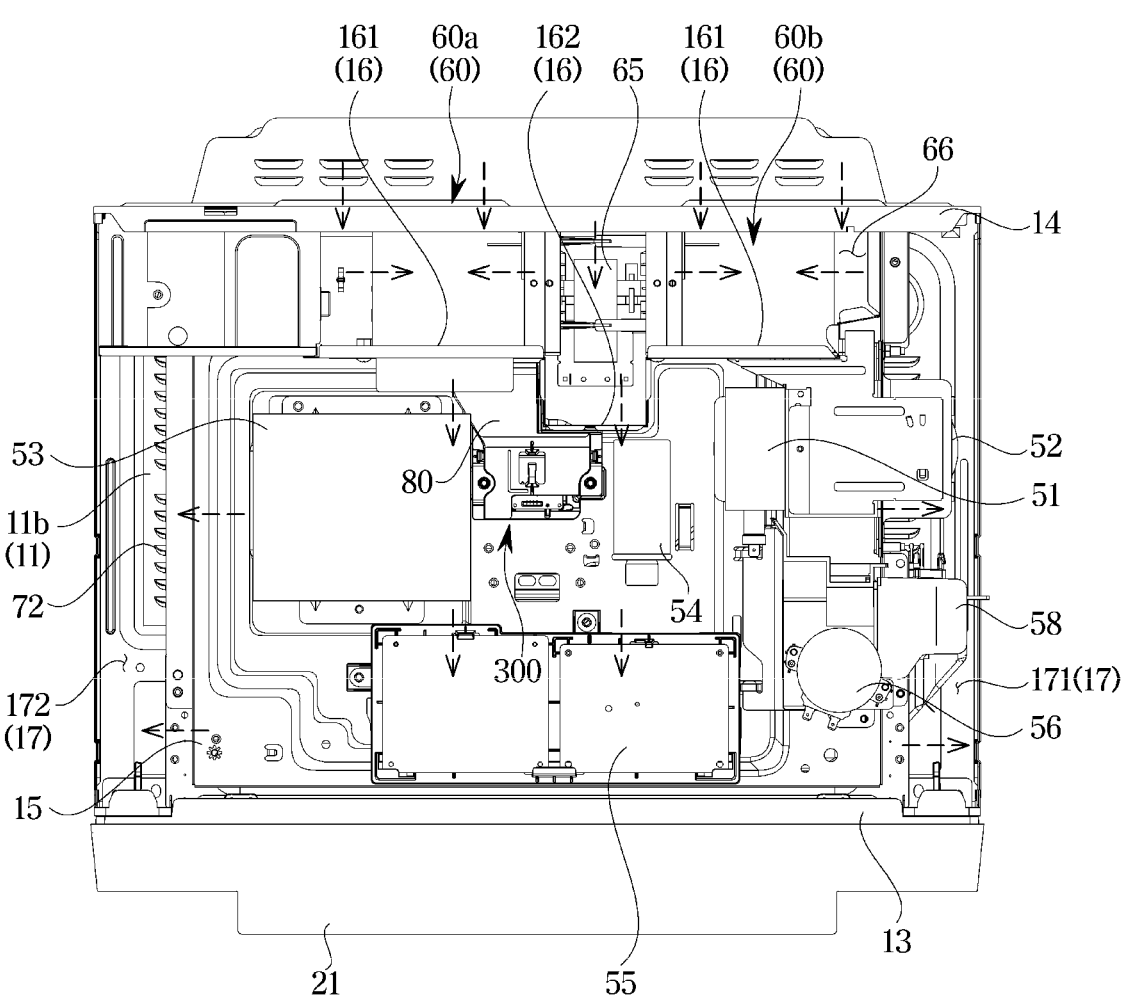
FIG. 7 is a plan view illustrating the cooking apparatus shown in FIG. 5.

FIG. 1 is a perspective view illustrating an example of a cooking apparatus according to an embodiment. FIG. 2 is a rear perspective view illustrating the cooking apparatus shown in FIG. 1. FIG. 3 is a perspective view illustrating the cooking apparatus shown in FIG. 1 with a door open. FIG. 4 is a perspective view illustrating the cooking apparatus shown in FIG. 3, which is seen in a different direction. FIG. 5 is a view illustrating outer cabinet the cooking apparatus shown in FIG. 1 with a part of an outer cabinet removed. FIG. 6 is a rear perspective view illustrating the cooking apparatus shown in FIG. 5. FIG. 7 is a plan view illustrating the cooking apparatus shown in FIG. 5.

Referring to FIGS. 1 to 7, a cooking apparatus 1 may include a main body 10 and a door 20 coupled to a front of the main body 10.

The main body 10 may have a cooking chamber 30 and an electrical equipment chamber 40 formed inside thereof.

The main body 10 may include an outer cabinet 11 and an inner cabinet 12 provided inside the outer cabinet 11.

The outer cabinet 11 may include a cover frame 11a and a bottom plate 11b. The cover frame 11a and the bottom plate 11b may be provided as separate components and coupled to each other. Alternatively, the cover frame 11a and the bottom plate 11b may be integrally formed with each other.

The bottom plate 11b may be provided with an air exhaust port 72. Air may flow out of the main body 10 through the air exhaust port 72. Details thereof will be described below.

For example, the inner cabinet 12 may include an upper plate 12a, side plates 12b and 12c, and a lower plate 12d. The upper plate 12a, the side plates 12b and 12c, and the lower plate 12d may be provided as separate components and coupled to each other. At least parts of the upper plate 12a, the side plates 12b and 12c, or the lower plate 12d may be integrally formed with each other.

Meanwhile, the side plates 12b and 12c may be referred to as sidewalls 12b and 12c. The side plate 12b may be referred to as a left wall 12b, and the side plate 12c may be referred to as a right wall 12c.

For example, the main body 10 may include a front plate 13 provided at the front of the inner cabinet 12. The main body 10 may include a rear plate 14 provided at the rear of the inner cabinet 12.

The front plate 13 may include an opening part 13a. The opening part 13a may be provided to allow the front of the cooking chamber 30 to be open. A user may access the cooking chamber 30 through the opening part 13a.

The front plate 13 may include a locking part 13b. The locking part 13b may be provided to accommodate a door protrusion 22 of the door 20 to be described below. The locking part 13b may be coupled to the door protrusion 22.

The front plate 13 may include a plate hole 13c. The plate hole 13c may be provided to discharge air having cooled the electrical equipment chamber 40. The air passed through the plate hole 13c may escape to the outside of the main body 10 through a gap between the door 20 and a front cover part 18.

The rear plate 14 may include an air intake port 71. Air may be introduced into the main body 10 through the air intake port 71. The air introduced into the main body 10 through the air intake port 71 may cool the electrical equipment chamber 40. Details thereof will be described below.

The door 20 may be provided to open and close the cooking chamber 30. The door 20 may be rotatably coupled to the main body 10.

The door 20 may include the door protrusion 22 formed to allow the door 20 to be coupled to the main body 10. The door protrusion 22 may be formed on the rear side of the door 20. The door protrusion 22 may protrude toward the main body 10. The door protrusion 20 may be provided to be coupled to the locking part 13b of the front plate 13. The door protrusion 20 may be provided to pass through the locking part 13b of the front plate 13 to thereby be fixed to a latch assembly (not shown) provided in the main body 10.

The door 20 may include a door handle 21. The user may open and close the door 20 by gripping the door handle 21. The door handle 21 may protrude forward from the door 20.

The door 20 may further include a choke (not shown) to shield or reduce leakage of electromagnetic waves. The door 20 may further include a see-through window 23 to visually check a cooking process.

The main body 10 may be provided at the front thereof with a front cover part 18. For example, the front cover part 18 may be positioned on the upper side of the door 20 and provided to cover the front of the electrical equipment chamber 40.

The front cover part 18 may be provided with a manipulation part 18a. The manipulation part 18a may be provided to receive an input of a user. The manipulation part 18a may be provided to display an operating state of the cooking apparatus 1. For example, the manipulation part 18a may include at least one of a touch panel or a display panel. In addition, although not shown in the drawings, the manipulation part 18a may include at least one of a button or a knob.

The cooking chamber 30 may be provided as a space in which food is cooked. The cooking chamber 30 may be formed by the inner cabinet 12. For example, the cooking chamber 30 may be formed by the inner cabinet 12, the front plate 13, and the rear plate 14.

In the cooking chamber 30, a tray 31 to place food thereon may be provided. The tray 31 may be rotatably provided in the cooking chamber 30 so that food placed on the tray 31 may be uniformly heated.

The cooking chamber 30 may be provided to cook food by at least one heating source. For example, the heating source may include a magnetron 51 for supplying microwaves (electromagnetic waves) to food. The magnetron 51 may be referred to as an electromagnetic wave generating device.

However, the disclosure is not limited thereto, and the heating source may further include at least one of a convection heating part (not shown) for supplying hot air to food or a grill heating part (not shown) for supplying radiant heat to food. That is, the cooking apparatus 1 may perform various heating modes. For example, the cooking apparatus 1 may perform an oven function as well as a microwave function.

The electrical equipment chamber 40 may be provided to accommodate electric components for operating the cooking apparatus 1. For example, the electrical equipment chamber 40 may be provided on the upper side of the cooking chamber 30. However, the disclosure is not limited thereto, and the electrical equipment chamber 40 may be provided on the lateral side of the cooking chamber 30.

The cooking apparatus 1 may include the magnetron 51. The magnetron 51 may be disposed in the electrical equipment chamber 40. The magnetron 51 may generate microwaves (electromagnetic waves) radiated (emitted) into the cooking chamber 30.

Microwaves generated by the magnetron 51 may be guided into the cooking chamber 30 through a wave guide 52. One side of the wave guide 52 may be connected to the magnetron 51, and the other side of the wave guide 52 may be connected to the cooking chamber 30. For example, the other side of the wave guide 52 may communicate with the sidewalls 12b and 12c forming the cooking chamber 30.

The cooking chamber 30 may be provided at an inside thereof with a microwave inlet 91 through which microwaves guided from the wave guide 52 are introduced. For example, the right sidewall 12c of the cooking chamber 30 may be provided with the microwave inlet 91. The electromagnetic waves introduced into the cooking chamber 30 may cook food while resonating in the cooking chamber 30.

In the electrical equipment chamber 40, a high voltage transformer (HVT) 53, a capacitor 54, and a circuit board 55 for driving the magnetron 51 may be provided.

Meanwhile, the cooking apparatus 1 may include damper devices 56, 57, and 58 for controlling an inflow of air for cooling the cooking chamber 30. For example, the damper device may include a driving motor 56, an opening and closing member 57, and an air guide 58.

The air guide 58 may be provided to guide air from the electrical equipment chamber 40 to the cooking chamber 30. The opening and closing member 57 may be provided to open and close the air guide 58. The driving motor 56 may drive the opening and closing member 57. For example, the driving motor 56 may rotate the opening and closing member 57.

The cooking chamber 30 may be provided inside thereof with a communication hole 92 through which air guided from the air guide 58 is introduced. For example, the communication hole 92 may be formed in the right sidewall 12c of the cooking chamber 30. The communication hole 92 may be provided in plural.

When food is cooked by emitting electromagnetic waves to the cooking chamber 30, moisture in the food may be released and thus fill the inside of the cooking chamber 30.

In this case, the opening and closing member 57 may open the air guide 58, and the air guide 58 may provide air into the cooking chamber 30. Accordingly, moisture inside the cooking chamber 30 may be removed.

When food is cooked by supplying hot air or radiant heat to the cooking chamber 30, there is a need to trap heat inside the cooking chamber 30. In this case, the opening and closing member 57 closes the air guide 58, and the air guide 58 may block the inflow of air into the cooking chamber 30. Accordingly, food may be effectively cooked by the heat inside the cooking chamber 30.

On the upper side of the upper plate 12a, a support plate 15 may be provided. Electric components may be seated on the upper side of the support plate 15. For example, the magnetron 51, the HVT 53, the capacitor 54, the circuit board 55, the driving motor 56, the opening and closing member 57, and the like may be disposed on the support plate 15. However, the disclosure is not limited thereto, and for example, the support plate 15 may be omitted and electric components may be disposed on the upper side of the upper plate 12a.

The cooking apparatus 1 may include a cooling fan assembly 60.

The cooling fan assembly 60 may be provided to cool the electrical equipment chamber 40. The cooling fan assembly 60 may lower the temperature of the electric components accommodated in the electrical equipment chamber 40. As a result, malfunctions, failures, and the like of electric components may be prevented.

The cooling fan assembly 60 may be provided inside the main body 10. The cooling fan assembly 60 may be disposed in a cooling fan assembly accommodating part 66.

For example, the cooling fan assembly accommodating part 66 may be provided behind the electrical equipment chamber 40. The cooling fan assembly accommodating part 66 may be separated from the electrical equipment chamber 40. The cooling fan assembly accommodating part 66 may be formed between a partition frame 16 and the rear plate 14.

The partition frame 16 may include a communication hole 16a so that the cooling fan assembly accommodating part 66 and the electrical equipment chamber 40 communicate with each other.

For example, the partition frame 16 may include a first partition part 161 provided between a cooling fan 61 to be described below and the electrical equipment chamber 40, and a second partition part 162 provided between a fan driving device 65 to be described below and the electrical equipment chamber 40. The communication hole 16a may be formed in the first partition part 161. The communication hole 16a may be provided to communicate with a discharge side 63 of the cooling fan 61.

For example, the cooling fan assembly 60 may be provided in plural. The cooling fan assembly 60 may include a first cooling fan assembly 60a and a second cooling fan assembly 60b. The first cooling fan assembly 60a and the second cooling fan assembly 60b may be arranged in a left-right direction. The first cooling fan assembly 60a and the second cooling fan assembly 60b may be arranged in an axial direction. The first cooling fan assembly 60a and the second cooling fan assembly 60b may be provided as a pair.

The cooling fan assembly 60 may include a cooling fan 61 and a fan housing 64. Each of the first cooling fan assembly 60a and the second cooling fan assembly 60b may include a cooling fan 61 and a fan housing 64.

The cooling fan 61 may be provided to suction air from the outside of the main body 10. The cooling fan 61 may form an air flow such that air is introduced through the air intake port 71 formed in the rear plate 14. A suction side 62 of the cooling fan 61 may communicate with the air intake port 71 of the rear plate 14. The cooling fan 61 may be provided to discharge air toward the electrical equipment chamber 40. The discharge side 63 of the cooling fan 61 may be disposed to face the electrical equipment chamber 40. The discharge side 63 of the cooling fan 61 may be provided to face the communication hole 16*a* of the partition frame 16. The discharge side 63 of the cooling fan 61 may be provided to communicate with the communication hole 16*a* of the partition frame 16. Air discharged from the cooling fan 61 may pass through the communication hole 16*a* and flow into the electrical equipment chamber 40.

For example, the cooling fan 61 may be provided as a centrifugal fan, and the cooling fan 61 may suction air in an axial direction and discharge the air in a radial direction.

The fan housing 64 may be provided to accommodate the cooling fan 61. The fan housing 64 may allow the air discharged from the cooling fan 61 to be directed to the electrical equipment chamber 40 without being dispersed.

A fan driving device 65 for driving the cooling fan assembly 60 may be provided. The fan driving device 65 may be provided to drive the cooling fan 61. The fan driving device 65 may be disposed in the cooling fan accommodating part 66. The fan driving device 65 may be provided between the second partition part 162 and the rear plate 14.

For example, the fan driving device 65 may drive at least one cooling fan 61. The fan driving device 65 may drive the cooling fan 61 of the first cooling fan assembly 60*a* and the cooling fan 61 of the second cooling fan assembly 60*b*. In this case, the fan driving device 65 may connect the cooling fan 61 of the first cooling fan assembly 60*a* and the cooling fan 61 of the second cooling fan assembly 60*b* to each other.

For example, the fan driving device 65 may include a motor and generate power to rotate the cooling fan 61.

Referring to FIGS. 5 to 7, an air intake and exhaust process of the cooking apparatus 1 will be described.

The cooking apparatus 1 may be provided to suction external air to cool the electrical equipment chamber 40 and discharge the air having cooled the electrical equipment chamber 40.

The rear plate 14 may include the air intake port 71 for suctioning external air. For example, the air intake port 71 may be provided in plural. The air intake port 71 may include a first air intake port 711 and a second air intake port 721. The first air intake port 711 may be provided at a position corresponding to the fan driving device 65, and the second air intake port 712 may be provided at a position corresponding to the cooling fan 61. However, the disclosure is not limited to the above-described example, and the air intake port 71 may not be restricted in the position and shape as long as it can suction external air.

The cooling fan assembly 60 may suction air from the outside through the air intake port 71. The cooling fan assembly 60 may discharge the suctioned external air to the electrical equipment chamber 40.

The suction side 62 of the cooling fan 61 may communicate with the air intake port 71. For example, the suction side 62 adjacent to the fan driving device 65 of the cooling fan 61 may communicate with the first air intake port 711, and the suction side 62 distant from the fan driving device 65 of the cooling fan 612 may communicate with the second air intake port 712.

The discharge side 63 of the cooling fan 61 may communicate with the electrical equipment chamber 40. The discharge side 63 of the cooling fan 61 may be disposed to face the electrical equipment chamber 40. The discharge side 63 of the cooling fan 61 may communicate with the electrical equipment chamber 40 through the communication hole 16*a* formed in the partition frame 16. The cooling fan 61 may discharge air forward.

The air discharged by the cooling fan 61 may pass through the communication hole 16*a* formed in the partition frame 16 and flow into the electrical equipment chamber 40.

The air introduced into the electrical equipment chamber 40 may cool the electrical equipment chamber 40. The air introduced into the electrical equipment chamber 40 may cool various electric components disposed in the electrical equipment chamber 40. For example, the air introduced into the electrical equipment chamber 40 may cool the electric components while flowing forward.

The bottom plate 11*b* may include the air exhaust port 72 for discharging air having cooled the electrical equipment chamber 40. For example, the air exhaust port 72 may be provided in plural.

An exhaust passage 17 may be provided between the electrical equipment chamber 40 and the air exhaust port 72. For example, the exhaust passage 17 may extend to correspond to the sidewalls 12*b* and 12*c*. The exhaust passage 17 may extend in the upper side and lower side direction between the inner cabinet 12 and the outer cabinet 11.

For example, the exhaust passage 17 includes a first exhaust passage 171 provided between the right sidewall 12*c* and the outer cabinet 11 and a second exhaust passage 172 provided between the left sidewall 12*b* and the outer cabinet 11.

The air having cooled the electrical equipment chamber 40 may flow through the exhaust passage 17 to thereby be discharged through the air exhaust port 72. The air having cooled the electrical equipment chamber 40 may flow to a lower right side along the first exhaust passage 171 and enter the air exhaust port 72. The air having cooled the electrical equipment chamber 40 may flow to a lower left side along the second exhaust passage 172 and enter the air exhaust port 72.

The air having cooled the electrical equipment chamber 40 may pass through the plate hole 13*c* of the front plate 13 and escape through a gap between the door 20 and the front cover part 18.

Figure 8:
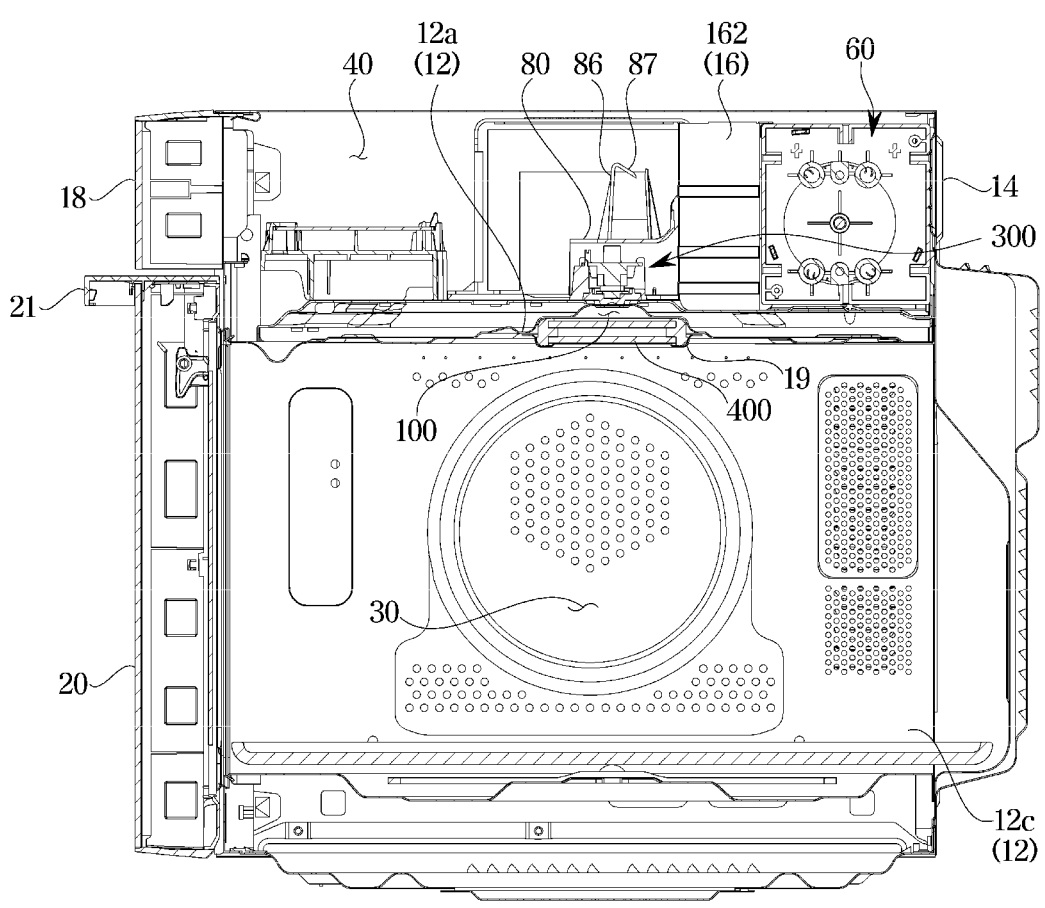
FIG. 8 is a cross-sectional view taken along line A-A' of the cooking apparatus shown in FIG. 1.
Figure 9:
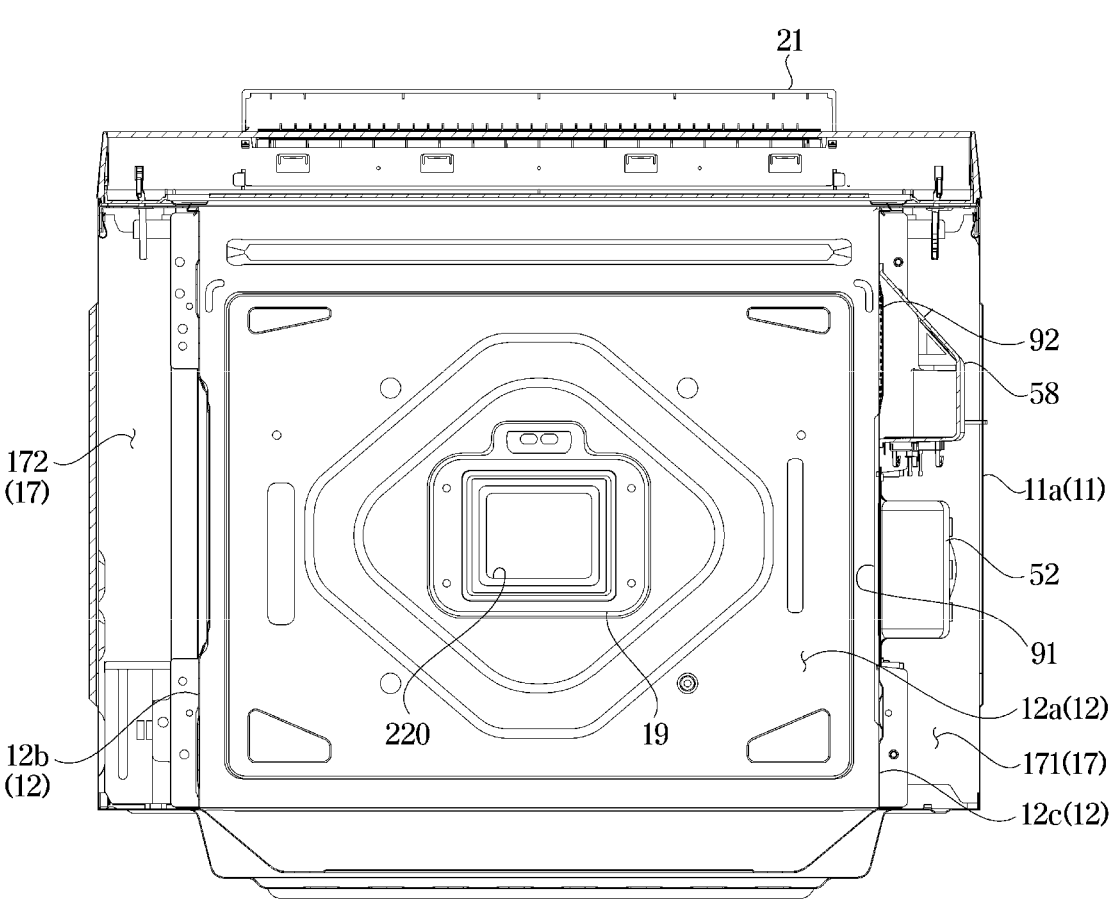
FIG. 9 is a cross-sectional view taken along line B-B' of the cooking apparatus shown in FIG. 1.

FIG. 8 is a cross-sectional view taken along line A-A' of the cooking apparatus shown in FIG. 1. FIG. 9 is a cross-sectional view taken along line B-B' of the cooking apparatus shown in FIG. 1. FIG. 10 is a cross-sectional view taken along line C-C' of the cooking apparatus shown in FIG. 1. FIG. 11 is a partially enlarged view of the cooking apparatus shown in FIG. 10.

The cooking apparatus 1 may include a photographing device 300 provided to photograph the inside of the cooking chamber 30. The user may identify information about food arranged inside the cooking chamber 30 or monitor the cooking state of the food through the photographing device 300.

For example, an image photographed by the photographing device 300 may be stored in a memory of the cooking apparatus 1. The image captured by the photographing device 300 may be transmitted to a user terminal (e.g., a smartphone, a personal computer (PC), or a tablet PC).

The photographing device 300 may be provided to face the inside of the cooking chamber 30. The photographing device 300 may be provided in the electrical equipment chamber 40. For example, the photographing device 300 may be provided above the cooking chamber 30. The photographing device 300 may be disposed on the upper side of the support plate 15.

The cooking apparatus 1 may include openings 210 and 220 provided so that the photographing device 300 may photograph the inside of the cooking chamber 30. The openings 210 and 220 may be provided to allow an optical signal to pass therethrough. The openings 210 and 220 may correspond to the photographing device 300. The openings 210 and 220 may allow the cooking chamber 30 to communicate with a part of the electrical equipment chamber 40 in which the photographing device 300 is disposed.

For example, the openings 210 and 220 may include a first opening 210 adjacent to the photographing device 300 and a second opening 220 adjacent to the cooking chamber 30.

The cooking apparatus 1 may include a resonance avoiding chamber 100 provided between the cooking chamber 30 and the photographing device 300. The resonance avoiding chamber 100 may be provided to avoid resonance caused by electromagnetic waves inside the cooking chamber 30. The resonance avoiding chamber 100 may be provided to prevent or reduce electromagnetic waves inside the cooking chamber 30 from leaking to the openings 210 and 220.

The conventional cooking apparatus has a small opening (e.g., an opening of about 8 mm) for photographing the inside of the cooking chamber. Such an opening may allow an optical signal to pass therethrough while preventing or reducing leakage of electromagnetic waves to the outside of the cooking chamber. However, in this case, since the aperture ratio of the opening is small, it is difficult to obtain a sufficient optical signal, and image interference may occur. As a result, it is not easy to secure a field of view for photographing. That is, the quality of the captured image may be lowered, and visibility may be lowered.

However, when a cooking apparatus including an opening with a large opening ratio, the amount of electromagnetic waves leaking through the opening may be great, so various electric components provided for the operation of the photographing device and the cooking apparatus may be damaged by electromagnetic waves leaking to the outside of the cooking chamber. For example, the photographing device and electric components may be deteriorated due to electromagnetic waves. In addition, electromagnetic waves leaking to the outside of the cooking apparatus through the opening may be harmful to the human body.

However, since the cooking apparatus 1 according to an embodiment is provided with the resonance avoiding chamber 100, leakage of electromagnetic waves to the outside of the cooking chamber 30 through the openings 210 and 220 may be prevented or reduced. The resonance avoiding chamber 100 may prevent resonance of the electromagnetic waves generated in the cooking chamber 30 from occurring, thereby reducing the intensity of the electric field of electromagnetic waves in the resonance avoiding chamber 100.

For example, when the conventional cooking apparatus has an opening between the cooking chamber and the photographing device, electromagnetic waves resonating in the cooking chamber may be leaking directly toward the photographing device through the opening. In contrast, the cooking apparatus 1 according to the embodiment has a space, in which resonance is avoided (i.e., the resonance avoiding chamber 100), between the cooking chamber 30 and the photographing device 300, so that resonant electromagnetic waves in the cooking chamber may be avoided from resonating in the resonance avoiding chamber 100. Accordingly, the amount of electromagnetic waves leaking out of the cooking chamber 30 through the openings 210 and 220 may be reduced.

Accordingly, since the cooking apparatus 1 includes the resonance avoiding chamber 100, the size of the first opening 210 adjacent to the photographing device 300 may be maximized. The cooking apparatus 1 may reduce the intensity of an electric field intensity of leaking electromagnetic waves, compared to the conventional cooking apparatus, thereby securing the first opening 210 with a relatively high opening ratio. As a result, the cooking apparatus 1 may easily obtain an optical signal while minimizing leakage of electromagnetic waves.

The average diameter of the first opening 210 may vary depending on the usable frequency of the cooking apparatus 1, the size of the cooking chamber 30, the type of the photographing device, and the like. However, when compared to a case including only an opening under the same condition, a case including the resonance avoiding chamber 100 may provide a larger opening. For example, the average diameter of the first opening 210 may be approximately 12 mm to 14 mm. However, this is merely an example and the disclosure is not limited thereto.

The resonance avoiding chamber 100 may be provided inside the inner cabinet 12.

The photographing device 300 may be provided outside the inner cabinet 12. The photographing device 300 may be provided outside the cooking chamber 30. Accordingly, the photographing device 300 may not be directly exposed to electromagnetic waves, heat, moisture, foreign substances, etc. in the cooking chamber 30. That is, damage to the photographing device 300 may be prevented, and the lifespan of the photographing device 300 may be extended.

The first opening 210 may be provided at one side of the resonance avoiding chamber 100. The first opening 210 may be provided to correspond to the photographing device 300. The first opening 210 may communicate with the resonance avoiding chamber 100.

The second opening 220 may be provided at the other side of the resonance avoiding chamber 100 to face the first opening 210. The second opening 220 may allow the resonance avoiding chamber 100 to communicate with the cooking chamber 100.

The second opening 220 may be spaced apart from the first opening 210 by a predetermined distance and provided adjacent to the cooking chamber 30 than the first opening 210 is. For example, the second opening 220 may be spaced downward from the first opening 210. However, the disclosure is not limited thereto, and when the photographing device 300 is disposed on the lateral side of the cooking chamber 30 (e.g., when the electrical equipment chamber 40 is formed on the lateral side of the cooking chamber 30), the second opening 220 may be spaced sideways and inwardly from the first opening 210.

As an example, the resonance avoiding chamber 100 may be formed by the inner cabinet 12. The resonance avoiding chamber 100 may be formed by the upper plate 12a. In this case, the upper plate 12a may include the openings 210 and 220 corresponding to the photographing device 300.

For example, the resonance avoiding chamber 100 may be formed by the inner cabinet 12 and the cover panel 19. The cover panel 19 may be coupled to the inner cabinet 12 to form a predetermined space (i.e., the resonance avoiding chamber 100). For example, the cover panel 19 may be coupled to a lower side of the inner cabinet 12. However, the disclosure is not limited thereto, and when the photographing device 300 is disposed on the lateral side of the cooking chamber 30 (e.g., when the electrical equipment chamber 40 is formed on the lateral side of the cooking chamber 30), the cover panel 19) may be coupled to an inner side of the inner cabinet 12.

The first opening 210 may be formed in the inner cabinet 12, and the second opening 220 may be formed in the cover panel 19.

Referring to FIG. 11, the resonance avoiding chamber 100 may have a size in which resonance of electromagnetic waves is prevented. For example, the second opening 220 may have a maximum width d1 smaller than or equal to approximately ½ of the wavelength of the electromagnetic waves, and the second opening 220 is spaced apart from the first opening 210 by a minimum distance d2 larger than or equal to ⅛ the wavelength of the electromagnetic waves. For example, when the cooking apparatus 1 uses a frequency of 2.45 GHz, the electromagnetic waves have a wavelength of approximately 122 mm. In this case, the maximum width d1 of the second opening 220 may be provided to be about 61 mm or less, and the minimum distance d2 from the second opening 220 to the first opening 210 may be provided to be about 15.25 mm or more. However, the disclosure is not limited thereto, and the size of the resonance avoiding chamber 100 may vary depending on various conditions, such as the usable frequency of the cooking apparatus 1, the size of the cooking chamber 30, and the type of photographing device.

For example, when the maximum width d1 of the second opening 220 is provided to exceed approximately ½ of the wavelength of the electromagnetic waves, the amount of the electromagnetic waves flowing into the resonance avoiding chamber 100 through the second opening 220 may increase. When the minimum distance d2 from the second opening 220 to the first opening 210 is provided to be less than approximately ⅛ of the wavelength of the electromagnetic waves, the electromagnetic waves in the cooking chamber 30 may be directly discharged from the second opening 220 to the first opening 220, and thus the effect of avoiding resonance of electromagnetic waves may be reduced.

The cooling fan assembly 60 may be provided to cool the photographing device 300. Air discharged from the cooling fan 61 may be directed toward the photographing device 300. The discharge side 63 of the cooling fan 61 may be provided to face the photographing device 300. The air discharged from the cooling fan 61 may pass through the communication hole 16a of the partition frame 16 and then flow to the photographing device 300.

Referring to FIG. 12, the cooking apparatus 1 may include a guide duct 80 provided to guide the air discharged from the cooling fan 61 to the photographing device 300.

The guide duct 80 may extend from a part of the discharge side 63 of the cooling fan 61 to the photographing device 300. The guide duct 80 may have one end connected to the discharge side 63 of the cooling fan 61, and the other end connected to the photographing device 300. The one end of the guide duct 80 may communicate with the communication hole 16a, and the other end of the guide duct 80 may communicate with the photographing device 300.

The guide duct 80 may guide the air discharged from the cooling fan 61 to flow to the photographing device 300 without leakage. Accordingly, the temperature of the photographing device 300 is prevented from rising. In addition, by cooling the photographing device 300, malfunctions of the photographing device 300 and degradation of image quality, which may occur due to a rise in temperature, may be prevented.

On the other hand, since the cooling fan assembly 60 for cooling the electrical equipment chamber 40 may also cool the photographing device 300, the cooking apparatus 1 may not be provided with a separate cooling device for cooling the photographing device 300. Accordingly, the cooking apparatus 1 may achieve a compact arrangement of internal components.

For example, the photographing device 300 may be disposed in the electrical equipment chamber 40. The photographing device 300 may be disposed adjacent to the discharge side 63 of the cooling fan 61. The guide duct 80 for guiding air from the cooling fan assembly 60 to the photographing device 300 may be provided. Air discharged from the cooling fan assembly 60 may be guided by the guide duct 80 to pass through the photographing device 300. Various electric components and the photographing device 300 may be disposed in front of the cooling fan assembly 60, and the discharge air of the cooling fan 61 may flow forward while cooling the electric components and the photographing device 300 in the electrical equipment chamber 40. Accordingly, the cooling fan assembly 60 may cool both the electric components (e.g., the magnetron 51, the HVT 53, the capacitor 54, the circuit board 55, etc.) and the photographing device 300.

FIG. 13 is a perspective view illustrating some components of the cooking apparatus shown in FIG. 5. FIG. 14 is an exploded perspective view illustrating some components of the cooking apparatus shown in FIG. 13. FIG. 15 is a perspective view illustrating a state in which an upper plate and a cover member shown in FIG. 13 are coupled to each other. FIG. 16 is a bottom perspective view illustrating the upper plate and the cover member shown in FIG. 15. FIG. 17 is a cutaway perspective view illustrating the upper plate and the cover member shown in FIG. 15. FIG. 18 is an enlarged view illustrating the upper plate shown in FIG. 13. FIG. 19 is a bottom view illustrating the upper plate and the cover member shown in FIG. 13.

Referring to FIGS. 13 and 14, the cooking apparatus 1 may include the upper plate 12a forming an upper wall of the cooking chamber 30 and the support plate 15 disposed on the upper side of the upper plate 12a.

On the upper side of the support plate 15, the photographing device 300, the cooling fan assembly 60, and the guide duct 80 may be provided. Although not shown in FIGS. 13 and 14, various electric components may be provided on the upper side of the support plate 15. Meanwhile, the disclosure is not limited thereto, and for example, the support plate 15 may be omitted, and the photographing device 300, the cooling fan assembly 60, and the guide duct 80 may be provided on the upper side of the upper plate 12a.

The support plate 15 may include a corresponding hole 15a. The support plate 15 may include the corresponding hole 15a corresponding to the openings 210 and 220 so that the photographing device 300 may photograph the inside of the cooking chamber 30. A protrusion 333 of a gasket 330 of the photographing device 300 to be described below may be provided to pass through the corresponding hole 15a and protrude toward the upper plate 12a (see FIG. 11).

A part of the inner cabinet 12 may be provided to form the resonance avoiding chamber 100. The resonance avoiding chamber 100 may be formed by the upper plate 12a and the cover panel 19. The resonance avoiding chamber 100 may be provided between the upper plate 12a and the cover panel 19.

For example, the inner cabinet 12 may include a first region S1 and a second region S2. The upper plate 12a may include the first region S1 and the second region S2. The second region S2, as a region other than the first region S1, may include the first opening 210 and extend upward from the first region S1. The cover panel 19 may include the second opening 220 and may be disposed at a lower side of the second region S2. The resonance avoiding chamber 100 may be formed by the second region S2 and the cover panel 19 arranged to correspond to the second region S2. However, this is only an example, and the disclosure is not limited thereto.

The cooking apparatus 1 may include a window member 400 provided to protect the photographing device 300. The window member 400 may be disposed in the resonance avoiding chamber 100. The window member 400 may be provided between the upper plate 12*a* and the cover panel 19. The window member 400 may be supported by the cover panel 19.

The cover panel 19 may be coupled to the upper plate 12*a* to form the resonance avoiding chamber 100. The cover panel 19 may be provided to support the window member 400.

For example, the cover panel 19 may include a cabinet coupling part 191, a groove part 192, and an extension part 193.

The cabinet coupling part 191 may be coupled to the inner cabinet 12. The cabinet coupling part 191 may be coupled to the upper plate 12*a*.

The groove part 192 may extend inwardly from the cabinet coupling part 191. The groove portion 192 may support the window member 400. The groove 192 may support a glass frame 430 of the window member 400 to be described below.

The extension part 193 may extend inwardly from the groove part 192. The extension part 193 may be provided to support a second glass 420 of the window member 400 to be described below. The second opening 220 may be formed in the extension part 193.

FIG. 20 is an enlarged view illustrating some components of the cooking apparatus shown in FIG. 13. FIG. 21 is a perspective view illustrating a photographing device shown in FIG. 13. FIG. 22 is an exploded perspective view illustrating the photographing device shown in FIG. 21. FIG. 23 is an exploded perspective view illustrating the photographing device shown in FIG. 22, seen in a different direction. FIG. 24 is a cutaway perspective view illustrating a window member shown in FIG. 13. FIG. 25 is a perspective view illustrating a blower shown in FIG. 13. FIG. 26 is a cutaway perspective view illustrating a blower shown in FIG. 13.

Referring to FIG. 20, the guide duct 80 may be provided to cover the photographing device 300. The guide duct 80 may be provided to be mounted above the photographing device 300. The guide duct 80 may be provided to be fixed to an upper side of the photographing device 300 while forming a space through which air may flow.

For example, the guide duct 80 may include a duct body 81, a guide part 82, and a coupling part 83.

The guide part 82 may extend from the duct body 81 toward the cooling fan assembly 60. The guide part 82 may be provided to be connected to the discharge side 63 of the cooling fan 61. The guide part 82 may include a shape sloping downward as being directed forward so as to smoothly guide the air discharged from the cooling fan 61.

The coupling part 83 may be coupled to the photographing device 300. The coupling part 83 may be coupled to a camera holder 320 of the photographing device 300 to be described below. The coupling part 83 may be detachably mounted to a duct mounting part 326 of the camera holder 320 to be described below.

For example, the coupling part 83 may include a coupling hole 84. The coupling part 83 may include a hook locking part 85. The coupling hole 84 of the coupling part 83 may be coupled to a coupling protrusion 327 of the camera holder

320. The hook locking part 85 of the coupling part 83 may be coupled to a duct fixing hook 328 of the camera holder 320.

For example, the guide duct 80 may include a wire holder 86. The wire holder 86 may be provided to hold a wire (not shown) disposed in the electrical equipment chamber 40. The wire holder 86 may protrude upward from the duct body 81. The wire holder 86 may include a clip 87 to prevent the wire mounted on the wire holder 86 from being separated. The clip 87 may be provided on an upper end of the wire holder 86. The wire holder 86 may be provided in plural.

Referring to FIGS. 21 to 24, the photographing device 300 may include a camera 310. The camera 310 may include a lens 311, a barrel 312, an image sensor 313 (see FIG. 11), and a camera circuit part 314. The camera 310 may convert an optical signal received from the lens 311 into an electrical signal.

The photographing device 300 may include the camera holder 320. The camera holder 320 may be provided to mount the camera 310 thereon. The camera holder 320 may support the camera 310. The camera 310 may be detachably mounted on the camera holder 320.

The camera holder 320 may include a holder body 321, a holder opening 322, and a gasket mounting part 323. The holder opening 322 may be formed to pass through the holder body 321. A gasket 330 to be described below may be mounted on the gasket mounting part 323. The gasket mounting part 323 may be formed along a circumference of the holder opening 322.

The camera holder 320 may include a camera support protrusion 324. The camera support protrusion 324 may protrude upward from the holder body 321.

The camera support protrusion 324 may include a camera support groove 324*a*. The camera 310 may be seated in the camera support groove 324*a*. For example, each corner of the camera circuit part 314 may be disposed in the camera support groove 324*a*.

The camera support protrusion 324 may be provided in plural. Although the camera support protrusions 324 are illustrated as four units, the disclosure is not limited thereto and the camera support protrusions 324 may be provided as three units or less, or more than four units.

The camera holder 320 may include a camera fixing protrusion 325. The camera fixing protrusion 325 may protrude upward from the holder body 321. The camera fixing protrusion 325 may include a camera fixing hook 325*a*. The camera 310 may be fixed to the camera holder 320 by the camera fixing hook 325*a*. For example, a part of the camera circuit part 314 may be provided to be caught by the camera fixing hook 325*a*.

The camera fixing protrusion 325 may be provided in plural. Although the camera fixing protrusions 325 are illustrated as two units, the number of the camera fixing protrusions 325 is not limited thereto and may be provided as one unit, or three or more units.

The camera 310 may be stably supported by the camera support protrusion 324 and the camera fixing protrusion 325.

The camera holder 320 may include the duct mounting part 326. The guide duct 80 may be detachably mounted to the duct mounting part 326. The coupling part 83 of the guide duct 80 may be mounted on the duct mounting part 326 of the camera holder 320.

For example, the duct mounting part 326 may include the coupling protrusion 327. The coupling protrusion 327 of the duct mounting part 326 may be coupled to the coupling hole 84 of the guide duct 80. The duct fixing hook 328 of the duct mounting part 326 may be coupled to the hook locking part 85 of the guide duct 80. The duct fixing hook 328 may be provided to be caught by the hook locking part 85.

The guide duct 80 may be stably mounted to the camera holder 320 by the duct mounting part 326 of the camera holder 320. The guide duct 80 may be stably disposed in the electrical equipment chamber 40 by the duct mounting part 326. Since the guide duct 80 is stably mounted on the camera holder 320, air discharged from the cooling fan assembly 60 is prevented from fluctuation in a course of being guided to the photographing device 300.

The photographing device 300 may include the gasket 330. The gasket 330 may be detachably mounted to the camera holder 320. The gasket 330 may be detachably mounted to the gasket mounting part 323 of the camera holder 320. The gasket 330 may support the lens 311 of the camera 310. The gasket 330 may support the barrel 312 of the camera 310.

The gasket 330 may be provided to maintain airtightness between the camera 310 and the inner cabinet 12. The gasket 330 may be provided to seal between the camera 310 and the inner cabinet 12. The gasket 330 may be provided to maintain airtightness between the camera 310 and the first opening 210. The gasket 330 may be provided to seal between the camera 310 and the resonance avoiding chamber 100. The gasket 330 may be provided to insulate between the camera 310 and the inner cabinet 12. The gasket 330 may be provided to prevent heat, electromagnetic waves, etc. in the inner cabinet 12 from being exposed to the electrical equipment chamber 40. For example, the gasket 330 may include an elastic material. The gasket 330 may include a silicon material.

For example, the gasket 330 may include a gasket opening 331, a seating part 332, and a protrusion 333.

The gasket opening 331 may be provided for the camera 310 to obtain an optical signal of the inside of the cooking chamber 30. The gasket opening 331 may be provided to correspond to the first opening 210.

The seating part 332 may allow the camera 310 to be detachably mounted thereon. The seating part 332 may be provided to support the barrel 312 of the camera 310.

The protrusion 333 may be provided to protrude toward the inner cabinet 12. The protrusion 333 may be provided to protrude toward the upper plate 12a by passing through the corresponding hole 15a. The protrusion 333 may be disposed on the outside of the upper plate 12a. The protrusion 333 may be disposed above the upper plate 12a. The protrusion 333 may be provided to contact the upper plate 12a.

The window member 400 may be provided to protect the photographing device 300 from the cooking chamber 30. For example, when electromagnetic waves, moisture, heat, foreign substances (contamination), etc. in the cooking chamber 30 are introduced into the photographing device 300 through the openings 210 and 220 and the corresponding hole 15a, the photographing device 300 may be damaged or have a reduced lifespan. The window member 400 may protect the photographing device 300 by preventing electromagnetic waves, moisture, heat, foreign substances (contamination), etc. in the cooking chamber from flowing into the photographing device 300.

Referring to FIG. 24, the window member 400 may include at least one glass 410 and 420. For example, a plurality of the glasses 410 and 420 may be provided. The window member 400 may include a first glass 410 and a second glass 420 spaced apart from the first glass 410. An air insulation layer may be formed between the first glass 410 and the second glass 420, thereby improving the insulation effect.

For example, the second glass 420 may be disposed to be spaced downward from the first glass 410.

The window member 400 may include a glass frame 430 for fixing the glasses 410 and 420. The glass frame 430 may include insertion grooves 431 and 432 into which the glasses 410 and 420 may be inserted. The insertion grooves 431 and 432 may have a shape recessed from an inner edge of the glass frame 430. For example, the glass frame 430 may include a first insertion groove 431 into which the first glass 410 is inserted and a second insertion groove 432 into which the second glass 420 is inserted.

Referring to FIGS. 25 and 26, the cooling fan assembly 60 may include the cooling fan 61 and the fan housing 64.

The cooling fan 61 may suction external air and discharge the suctioned external air toward the electrical equipment chamber 40. For example, the cooling fan 61 may suction air in an axial direction and discharge the air in a radial direction.

The discharge side 63 of the cooling fan 61 may communicate with the electrical equipment chamber 40. The discharge side 63 of the cooling fan 61 may communicate with the photographing device 300.

For example, the cooling fan 61 may include a hub plate 610 and a plurality of blades 613 arranged in a circumferential direction of the hub plate 610. The cooling fan 61 may include a first ring 611 spaced apart from one side of the hub plate 610 and a second ring 612 spaced apart from the other side of the hub plate 610. The one side of the hub plate 610 may be a side adjacent to the fan driving device 650, and the other side of the hub plate 610 may be a side opposite to the one side of the hub plate 610.

Air introduced into the main body 10 of the cooking apparatus 1 may be suctioned toward the first ring 611 and the second ring 612 of the cooling fan 61. For example, the first ring 611 may communicate with the first air intake port 711, and the second ring 612 may communicate with the second air intake port 712.

For example, the cooling fan 61 includes a first blower part 614 provided between the one side of the hub plate 610 and the first ring 611, and a second blower part 615 provided between the other side of the hub plate 610 and the second ring 612.

At least one of the first blower part 614 or the second blower part 615 may communicate with the photographing device 300. At least one of the first blower part 614 or the second blower part 615 may be connected to the guide duct 80. In the drawings, the first blower part 614 of the first fan assembly 60a is illustrated as corresponding to the guide duct 80, the disclosure is not limited thereto. For example, the second blower part 615 of the first fan assembly 60a may correspond to the guide duct 80. Alternatively, at least one of the first blower part 614 or the second blower part 615 of the second fan assembly 60b may correspond to the guide duct 80.

The fan housing 64 may be provided to accommodate the cooling fan 61. The fan housing 64 may be provided to cover the cooling fan 61.

The fan housing 64 may include an inlet 641 through which air is introduced into the cooling fan 61 and an outlet 642 through which air from the cooling fan 61 is discharged. The inlet 641 may correspond to the suction side 62 of the cooling fan 61, and the outlet 642 may correspond to the discharge side 63 of the cooling fan 61. The outlet 642 may correspond to the communication hole 16*a* of the partition frame 16.

The fan driving device 65 may be provided to drive the cooling fan 61. The fan driving device 65 may include a fan driving source 651 for generating power and a shaft 652 for transmitting the power generated from the fan driving source 651 to the cooling fan 61.

For example, the fan driving device 65 may drive both the cooling fan 61 of the first fan assembly 60*a* and the cooling fan 61 of the second fan assembly 60*b*. However, the disclosure is not limited thereto, and the fan driving device 65 may be provided as a plurality of fan driving devices to drive the cooling fan 61 of the first fan assembly 60*a* and the cooling fan 61 of the second fan assembly 60*b*, respectively.

The shaft 652 may extend from the fan driving source 651 to the hub plate 610 of the first fan assembly 60*a*. The other end of the shaft 652 may be coupled to a shaft coupling part 616 of the first fan assembly 60*a*.

The shaft 652 may extend from the fan driving source 651 to the hub plate 610 of the second fan assembly 60*b*. The other end of the shaft 652 may be coupled to a shaft coupling part 616 of the second fan assembly 60*b*.

One aspect of the disclosure provides a cooking apparatus having an improved structure to prevent or reduce leakage of electromagnetic waves.

Another aspect of the disclosure provides a cooking apparatus capable of facilitating photographing of inside of a cooking chamber.

Although certain illustrative embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A cooking apparatus comprising:
   a cabinet including a cooking chamber, the cooking chamber positioned at an interior of the cabinet;
   an electromagnetic wave generating device to emit electromagnetic waves into the cooking chamber, the electromagnetic wave generating device being positioned outside the cooking chamber;
   a photographing device to photograph an interior of the cooking chamber, the photographing device being positioned outside the cooking chamber;
   a resonance avoiding chamber positioned between the cooking chamber and the photographing device; and
   a window member configured to protect the photographing device from the cooking chamber,
   wherein the resonance avoiding chamber comprises a pair of openings formed in the cabinet to allow an optical signal from the photographing device to pass through to the cooking chamber,
   wherein the resonance avoiding chamber is configured to reduce resonance caused by the electromagnetic waves and reduce the electromagnetic waves inside the cooking chamber from leaking through the pair of openings to an exterior of the cooking chamber,
   wherein the window member is positioned inside the resonance avoiding chamber, and
   wherein the window member comprises a first glass and a second glass spaced apart from the first glass, and the first glass and the second glass are between the pair of openings.

2. The cooking apparatus of claim 1, wherein one opening of the pair of openings is a first opening, and
   the first opening is positioned at one side of the resonance avoiding chamber and connected with the resonance avoiding chamber, and
   the other opening of the pair of openings is a second opening positioned at another side of the resonance avoiding chamber while facing the first opening, the second opening connecting the resonance avoiding chamber with the cooking chamber.

3. The cooking apparatus of claim 2, wherein the second opening has a maximum width that is less than or equal to ½ of a wavelength of the electromagnetic waves, and
   a minimum distance from the second opening to the first opening is larger than or equal to ⅛ of the wavelength of the electromagnetic waves.

4. The cooking apparatus of claim 2, wherein the cabinet further includes a first region; and
   a second region, the second region different from the first region, the second region including the first opening and formed to extend upward from the first region.

5. The cooking apparatus of claim 4, further comprising a cover panel including the second opening and disposed below the second region, and
   the resonance avoiding chamber is formed by the second region and the cover panel.

6. The cooking apparatus of claim 1, wherein the resonance avoiding chamber is formed inside the cabinet, and the photographing device is disposed outside the cabinet.

7. The cooking apparatus of claim 1, further comprising an electrical equipment chamber separated from the cooking chamber and to accommodate the electromagnetic wave generating device and the photographing device; and
   a cooling fan configured to suction air and discharge the air into the electrical equipment chamber to cool the electrical equipment chamber.

8. The cooking apparatus of claim 7, further comprising a guide duct formed to extend from a part of a discharge side of the cooling fan to the photographing device to guide the discharged air from the cooling fan to the photographing device.

9. The cooking apparatus of claim 8, wherein the guide duct further includes a wire holder on which a wire disposed in the electrical equipment chamber is mountable.

10. The cooking apparatus of claim 7, further comprising an air intake port, formed at a rear side of the cabinet, through which the air is suctioned.

11. The cooking apparatus of claim 10, wherein a suction side of the cooling fan is connected with the air intake port, and a discharge side of the cooling fan is adjacent to the electrical equipment chamber such that the air suctioned by the air intake port flows forward toward the electrical equipment chamber.

12. The cooking apparatus of claim 11, wherein the cabinet is an inner cabinet, and
   the cooking apparatus further comprises:
      an outer cabinet to cover the inner cabinet and the electrical equipment chamber;
      an exhaust passage, formed to extend along an upper side and lower side direction between the inner cabinet and the outer cabinet, through which the air having cooled the electrical equipment chamber flows; and
      an exhaust port formed at a lower side of the outer cabinet so that the air flowing through the exhaust passage is discharged outside of the cooking apparatus.

13. The cooking apparatus of claim 1, wherein the window member is configured to be attachable to and detachable from the resonance avoiding chamber to protect the photographing device from the cooking chamber.

14. The cooking apparatus of claim 1, wherein the air insulation layer is formed between the first glass and the second glass.

15. The cooking apparatus of claim 1, wherein the photographing device includes:

a camera;

a camera holder to mount the camera thereon; and a gasket, mountable on the camera holder, configured to maintain airtight between the camera and the pair of openings, while the gasket is mounted on the camera holder.

16. The cooking apparatus of claim 1, wherein the window member further includes a glass frame configured to fix the first glass and the second glass.

17. The cooking apparatus of claim 16, further comprising a cover panel including one opening of the pair of openings which connects the resonance avoiding chamber with the cooking chamber, and the cover panel is configured to support the glass frame.

18. A cooking apparatus comprising:

a main body including a cooking chamber and an electrical equipment chamber provided at an upper side of the cooking chamber;

a camera disposed in the electrical equipment chamber to face an inside of the cooking chamber;

a resonance avoiding chamber having an upper side corresponding to the camera to photograph the inside of the cooking chamber and a lower side communicating with the cooking chamber;

a window member configured to protect the camera from the cooking chamber, an intake port formed on a rear side of the main body to communicate with an outside of the main body; and a cooling fan provided to cool the electrical equipment chamber and disposed such that a suction side of the cooling fan communicates with the intake port and at least a part of a discharge side of the cooling fan faces the camera; and wherein the resonance avoiding chamber comprises a pair of openings formed in the cooking chamber to allow an optical signal from the camera to pass through to the cooking chamber, wherein the resonance avoiding chamber is configured to reduce resonance caused by the electromagnetic waves and reduce the electromagnetic waves inside the cooking chamber from leaking through the pair of openings to an exterior of the cooking chamber, and wherein the window member is positioned inside the resonance avoiding chamber and wherein the window member comprises a first glass and a second glass spaced apart from the first glass, and the first glass and the second glass are between the pair of openings.

19. The cooking apparatus of claim 18, further comprising:

a guide duct provided to guide air discharged from the cooling fan to the camera.

20. The cooking apparatus of claim 18, further comprising:

a gasket provided to seal between the camera and the resonance avoiding chamber.

21. The cooking apparatus of claim 18, wherein the resonance avoiding chamber includes a region, communicating with the cooking chamber, having a maximum width less than or equal to $\frac{1}{2}$ of a wavelength of the electromagnetic waves, wherein a height from the region communicating with the cooking chamber to a region corresponding to the camera is greater than or equal to $\frac{1}{8}$ of the wavelength of the electromagnetic waves.

* * * * *